United States Patent
Goldenblum

(10) Patent No.: US 6,962,052 B2
(45) Date of Patent: Nov. 8, 2005

(54) ENERGY GENERATION MECHANISM DEVICE AND SYSTEM

(76) Inventor: Haim Goldenblum, Kfar Reshef 13, Nof Yam, Herzeliya 46324 (IL)

( * ) Notice: Subject to any disclaimer, the term of this patent is extended or adjusted under 35 U.S.C. 154(b) by 0 days.

(21) Appl. No.: 10/341,365

(22) Filed: Jan. 9, 2003

(65) Prior Publication Data

US 2003/0145593 A1 Aug. 7, 2003

Related U.S. Application Data

(63) Continuation of application No. 09/679,200, filed on Sep. 29, 2000, now abandoned, which is a continuation of application No. 09/263,849, filed on Mar. 8, 1999, now Pat. No. 6,167,704, which is a continuation of application No. PCT/IL97/00299, filed on Sep. 8, 1997.

(30) Foreign Application Priority Data

Sep. 8, 1996 (IL) .............................................. 119216
Feb. 17, 1997 (IL) .............................................. 120242

(51) Int. Cl.[7] .............................................. F01K 27/00
(52) U.S. Cl. .................................. 60/641.1; 60/649
(58) Field of Search .............................. 60/641.1, 649, 60/202, 203.1

(56) References Cited

U.S. PATENT DOCUMENTS

| | | | | |
|---|---|---|---|---|
| 4,873,467 A | * | 10/1989 | Kaufman et al. | ........ 313/360.1 |
| 5,239,820 A | * | 8/1993 | Leifer et al. | ................... 60/202 |
| 5,448,883 A | * | 9/1995 | Meserole et al. | ............. 60/202 |
| 6,167,704 B1 | * | 1/2001 | Goldenblum | ............... 60/641.1 |

* cited by examiner

Primary Examiner—Hoang Nguyen

(57) ABSTRACT

The present invention is converting any environmental heat into a useful form of energy, by utilizing kinetic energy of randomly moving particles, by use a mechanism which selectively block particles by their direction related said mechanism, for creating a force, or a pressure difference or a flow of particles, and etc, for example, in FIG. 6e of the Patent, we use a permeable membrane-50 that divides a box-35 into two sub-compartments, A and B, the membrane is covered only on one side of it by tiny unidirectional gates-54, that let passing through particles-15 from subcompartment B to subcompartment A, but block the passing through back of particles from subcompartment A to subcompartment B, so as a result there will be generated a general flow-V of gas from subcompartment B to subcompartment A through the membrane-50, and this flow will rotate the turbine-70 and return back in circulation, and since the particles lost some of their kinetic energy during their pass through the turbine, we use a heat-absorber-133 for returning the particles heat energy from the surrounding environment.

50 Claims, 12 Drawing Sheets

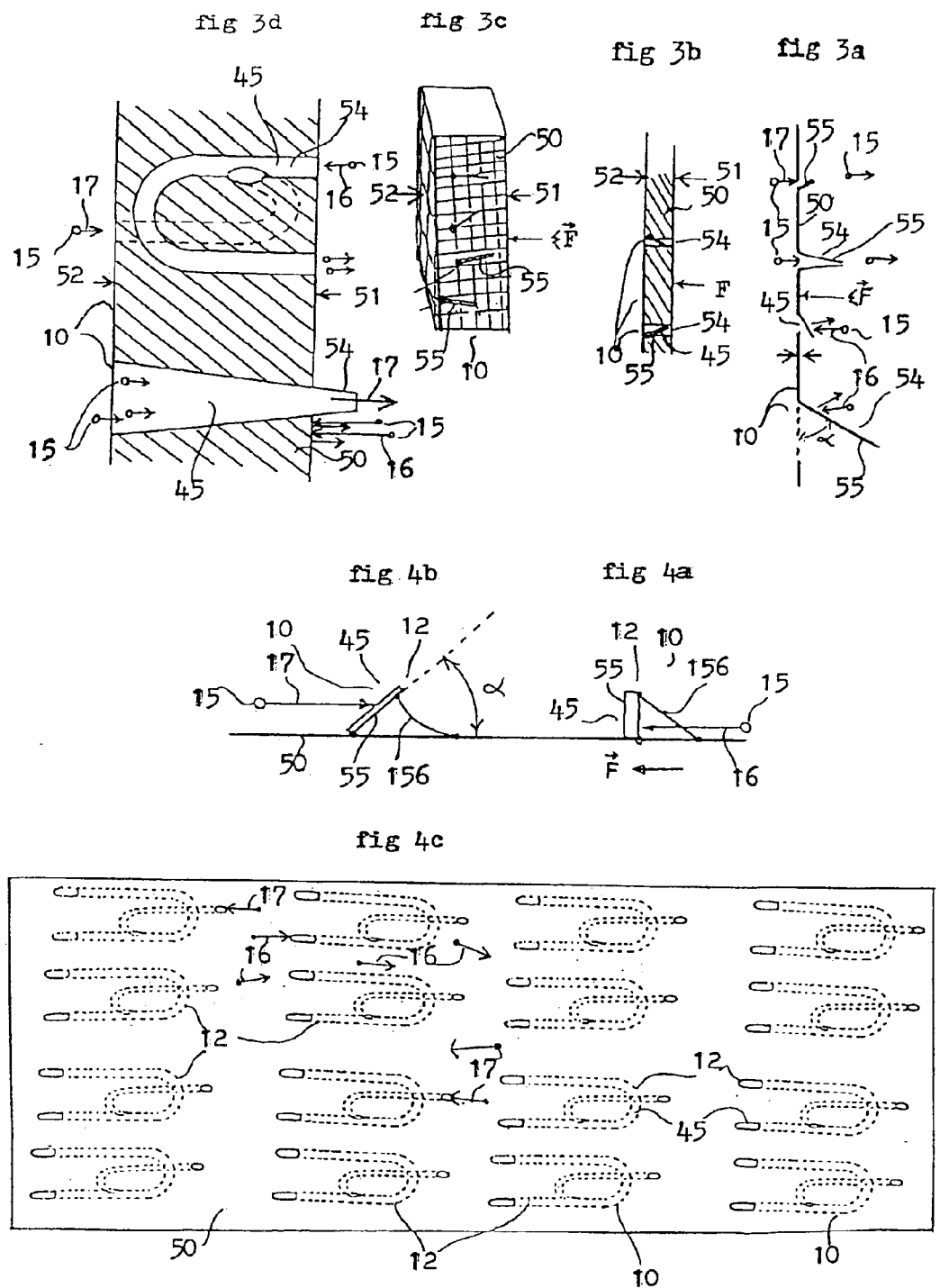

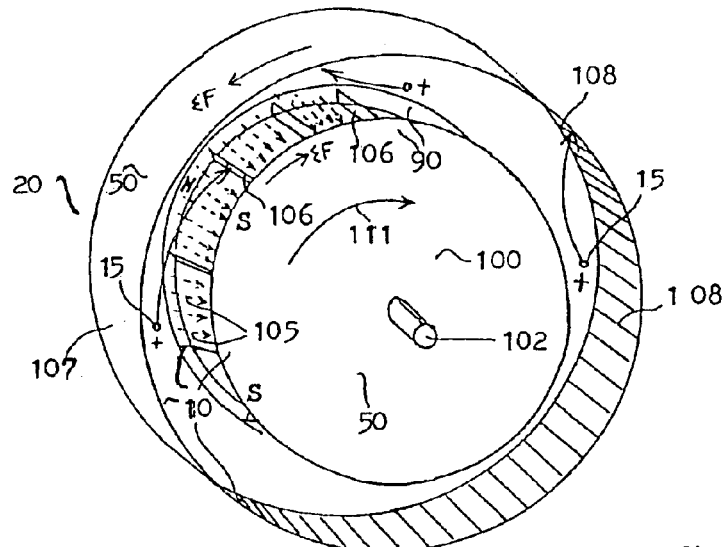
fig. 5
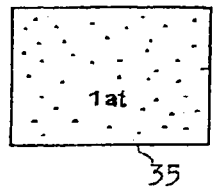
fig 6a
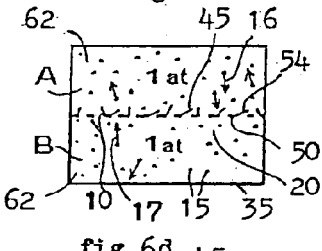
fig 6b
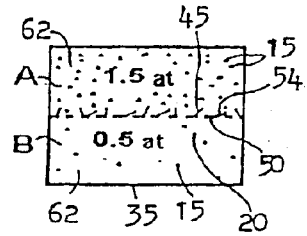
fig 6c
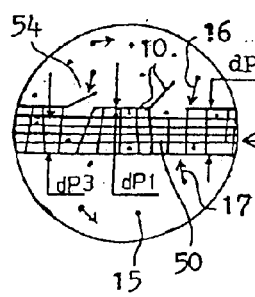
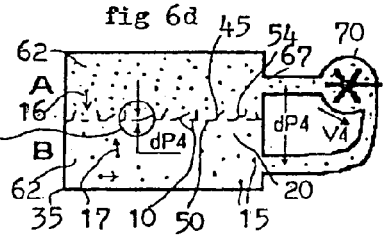
fig 6d
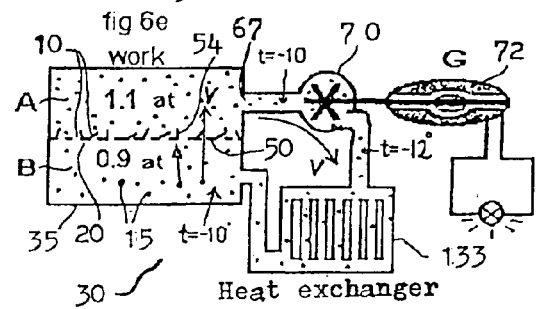
fig 6e

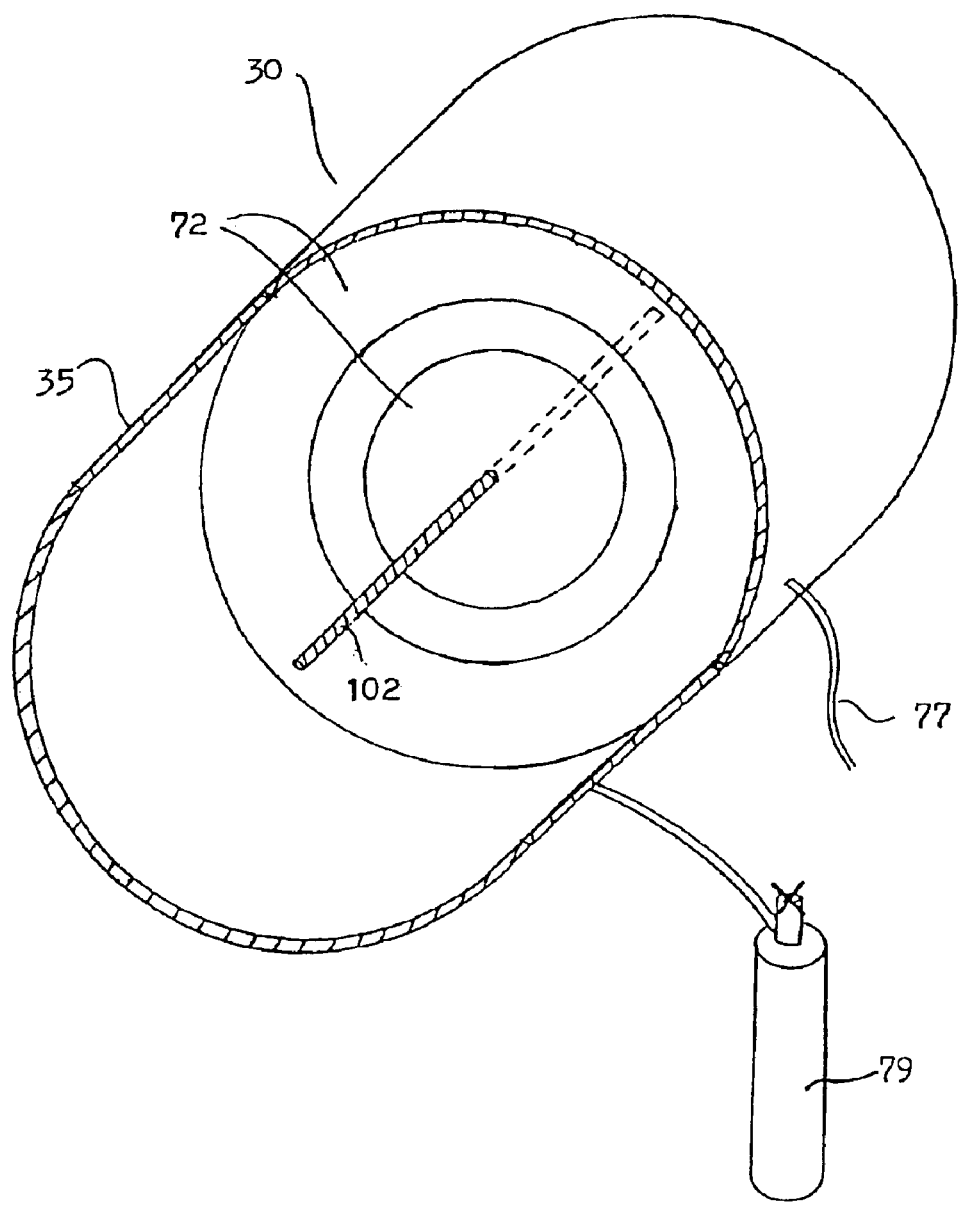

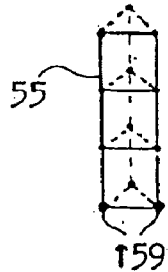
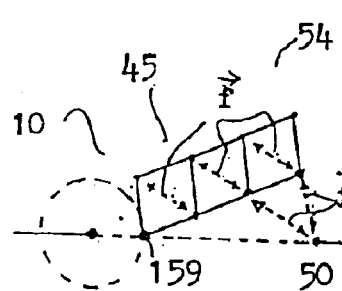
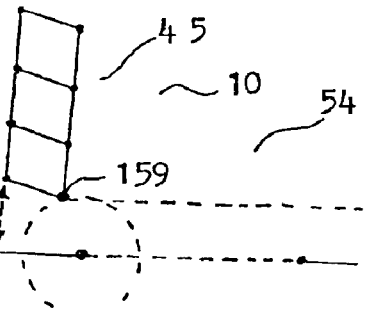
fig 10a  fig 10b  fig 10c
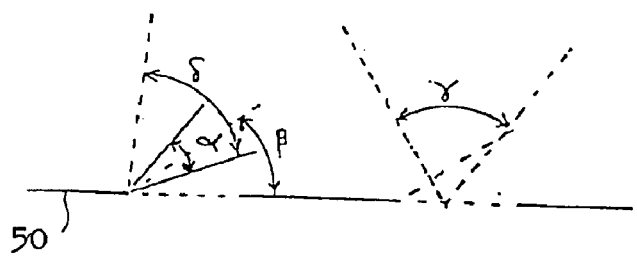
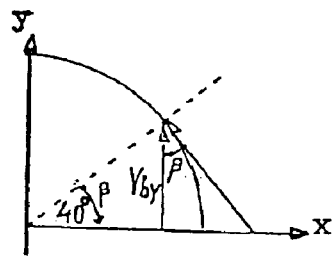
fig 11a  fig 11b  fig 11c
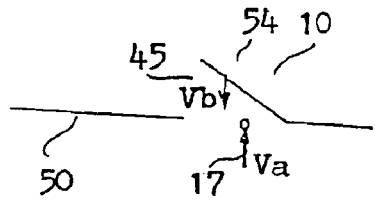
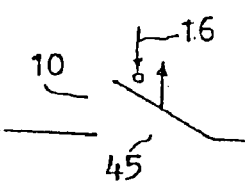
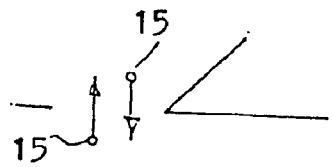
fig 12a  fig 12b  fig 12c
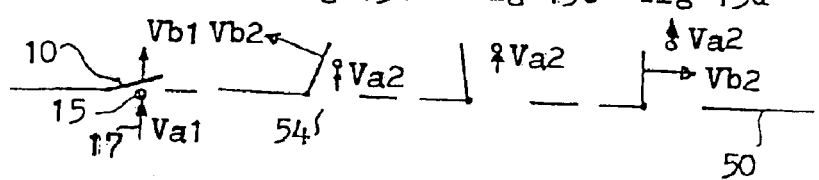
fig 13a  fig 13b  fig 13c  fig 13d
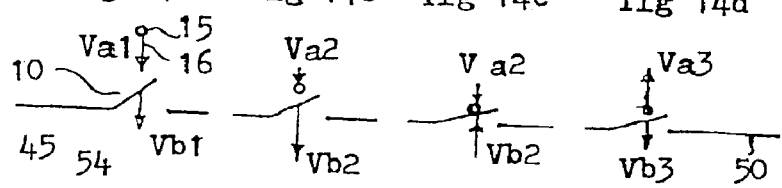
fig 14a  fig 14b  fig 14c  fig 14d

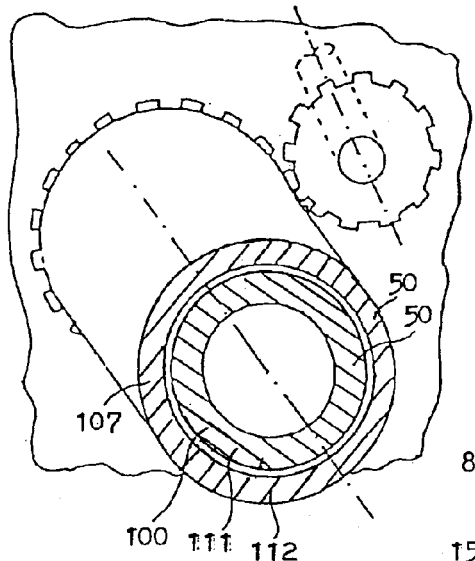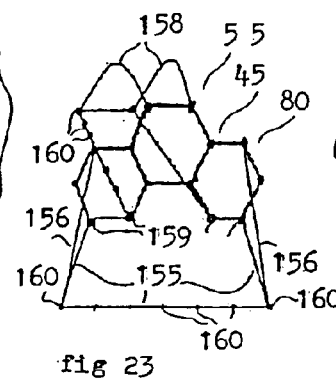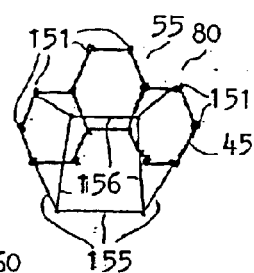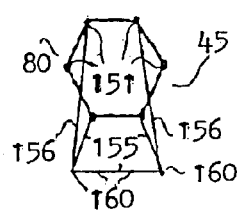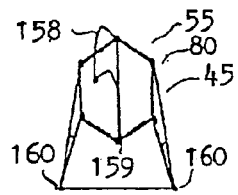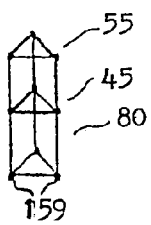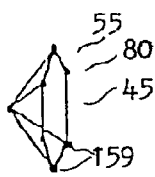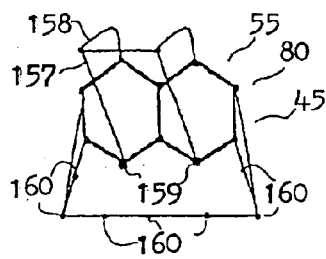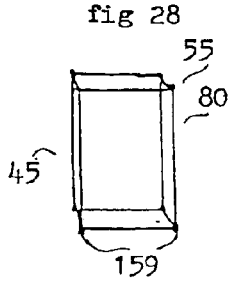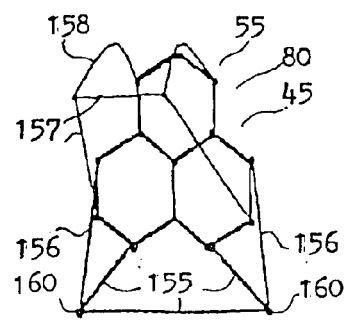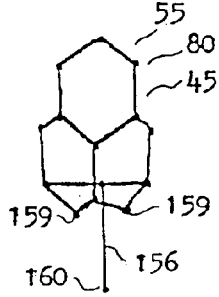

ENERGY GENERATION MECHANISM DEVICE AND SYSTEM

CROSS-REFERENCES TO RELATE APPLICATIONS

This application is a continuation to application 09/679,200 on the date of 29 Sep. 2000, now abandoned, which is a continuation to application 09/263,849 on the date of 8 Mar. 1999 on which was given U.S. Pat. No. 6,167,704, and which is a continuation to the international application PCT/IL97/00299 from the date of 8 Sep. 1997, and based on the priority applications: 119216 on the date 8 Sep. 1996 and 120242 on the date of 17 Feb. 1997 which submitted in ISRAEL. All said applications are on the name of the inventor Goldenblum Haim.

REFERENCE TO A "MICROFICHE APPENDIX"

Not applicable.

STATEMENT REGARDING FEDERALLY SPONSORED RESEARCH OR DEVELOPMENT

Not applicable.

BACKGROUND OF THE INVENTION

1. Field of the Invention

Environmental friendly prior state of the state of the art technologies in the field of energy conversion teach the use of solar, wind and sea waves as a primary source of readily available energy to be converted into electrical energy and the like.

Such prior state of the state of the art technologies have a major drawback since they depend upon the availability of the primary energy sources. For example solar energy is not available during night time. Wind is not always blowing at a constant speed and direction, whereas sea waves to a great extent depend upon tide cycles.

The prior art fails to teach the use environmental heat or kinetic energy of particles as an energy source for such conversions.

As well known, any fluid material, such as gas and liquid or the like, is made of more or less freely moving particles (atoms, molecules, clusters thereof, etc.) which at any given temperature is acquire a certain kinetic energy or heat energy value (90 kcal for $m^3$ of air; 300 kcal for 1 kg of water under average environmental conditions).

According to the present invention we use any environmental heat, such as within water as in the seas, rivers, etc., or within the air surrounding, as a primary source of energy, which is converted here into a usable form of energy, such as an electrical or mechanical energy, etc.

2. Description of the Related Art including information Disclosed

The present invention relates to a method, mechanism, device and system for converting environment energy especially of an environmental heat (kinetic energy of randomly moving particles, meaning, with no need of a temperature differences from the first place in this environment), into a usable form of energy (e.g., mechanical or electrical energy). Also we have an academic support.

BRIEF SUMMARY OF THE INVENTION

According to the present invention there are provided a method, mechanism, device and system for converting environmental energy, especially of an environmental heat (kinetic energy of randomly moving particles, meaning, with no need of a temperature differences from the first place in this environment, and also meaning to any kind of source of environmental heat including within the atmosphere, within the water at the surrounding environment as in the seas or rivers etc., within the ground, and sun beams, etc.) into a useful form of energy (e.g., mechanical or electrical energy), by utilizing the kinetic energy of randomly moving particles.

According to further features in preferred embodiments of the invention described below the mentioned above method comprising an operation steps of a mechanism which selectively blocks more particulars that are moving in one general direction related to the mechanism (linear and/or rotary) than particles that are moving in the opposite direction to the first one, for creating an equivalent vectorial force $\Sigma Fx$, and/or a pressure difference and/or a flow of gases/liquids particles, and by these, supply energy for different purposes.

This selectively blocking the randomly moving particles, is made here actually in the micro-level, in which principle each particle and particle is blocked separately from the other particles, and in any case there no need more than few particles moving at the same moment and in the same direction and at the same point, for use these particles energy.

According to still further features in the described preferred embodiments, said force that created on said mechanism is usable for moving a body which the mechanism is connected to.

According to still further features in the described preferred embodiments the body is a permeable membrane.

According to still further features in the described preferred embodiments the mechanism comprising at least one of the following:
1) a unidirectional permeable surface (also a membrane) to the moving particles,
2) a tiny unidirectional elements that their smallest dimension (from x,y,z dimensions) can be from one single atom, till 1 mm, and can be with a moveable part or stationary, and can comprising at least one of the following: a) unidirectional gates, or b) unidirectional blocks, etc.
3) a magnet that operate in interaction with ions and muzzles.

Also said mechanism can comprising additionally a barrier (also in plural)

According to further features in preferred embodiments of the invention the mentioned above device comprising the mentioned above mechanism and aid means comprising a body on which the mentioned mechanism will be attached to, and can be unseparated from said mechanism and in some of these cases we will related to this body as said mechanism, also the mentioned above aid means are barriers, a pivot and etc.

According to further features in preferred embodiments of the invention described below the mentioned above system comprising the mentioned above device which is including the mentioned mechanism, and by them, it is converting environmental energy (especially of heat) into a useful form of energy, and supply energy for different purposes. Also the system can comprise a randomly moving particles (atoms, molecules, clusters thereof, etc.) that the mentioned above mechanism substantially selectively blocks by their direction related to the mechanism position, Also this system can contain a container in which will be the above mentioned device, and also some kind of a transmission system and also a heat exchanger.

According to still further features in one of the described preferred embodiments the particles are ions.

According to further features in preferred embodiments of the invention described below, there is provided a method for manufacturing a mechanism which converting kinetic energy of particles into a usable form of energy.

The present invention successfully addresses the shortcomings of the presently known configurations by providing a method mechanism device and system for converting kinetic energy of randomly moving particles into a usable form of energy, which operate under any conditions.

BRIEF DESCRIPTION OF THE SEVERAL VIEWS OF THE DRAWINGS

The invention herein described, by way of example only, with reference to the accompanying drawings, wherein:

FIGS. 3a–d are schematic depiction of different kinds of tiny gates formed in or on the body.

FIGS. 4a–c presents tiny unidirectional stoppers according to the present invention;

FIG. 5 is a three-dimensional view of a device according to the present invention, supplemented with a magnet/electromagnet, capable of pulling or pushing ions moving in certain directions and blocking them employing suitable mechanical means;

FIGS. 6a–e presents a device which causes particles of a fluid (gas or liquid) to redistribute such that their kinetic energy may be converted into another form of energy;

FIG. 9 is a three-dimensional view of means to control the power provided by the system, by controlling the pressure of fluid in the system and the rotation velocity by extending/shortening the radius of rotation;

FIGS. 10a–c are schematic depictions of different positions of the gates according to the present invention;

FIGS. 11a–c are schematic depictions demonstrating the position of the gates;

FIGS. 12a–c are schematic depictions demonstrating the "unprofitable positions" of the gates according to the present invention;

FIGS. 13a–d and 14a–d are schematic depictions demonstrating the forces exerted on the gates according to the present invention;

FIG. 20 is a three-dimensional view of a device which operates with a magnet or an electromagnet;

FIGS. 21 and 22 demonstrate gates and stoppers according to the present invention based on the PHENANTHRENE molecule stabilized onto a surface via molecular-chains;

FIGS. 23 and 24 demonstrate gates and stoppers according to the present invention based on the CYCLOHEXANE and the BENZENE molecules, stabilized onto a surface via molecule-chains;

FIG. 25 demonstrates gates and stoppers based on the $=C_9H_3$ molecule as a triangle-prism;

FIG. 26 demonstrates gates and stoppers based on the BENZENE molecule;

FIG. 27 demonstrates gates and stoppers based on the NAPHTHALENE molecule stabilized onto a surface via molecule-chains;

FIG. 28 demonstrates gates and stoppers based on a molecule with shape of a rectangular-prism;

FIGS. 29 and 30 demonstrate gates and stoppers based on the PHENALENE molecule stabilized onto a surface via molecule-chains;

DETAILED DESCRIPTION OF THE INVENTION

Figure 1:
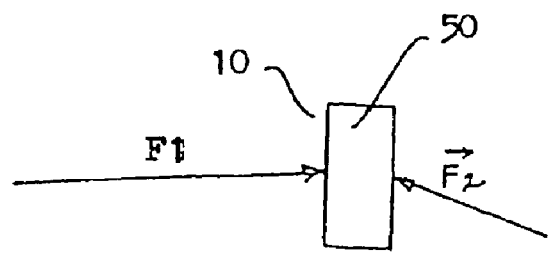
FIG. 1 demonstrate vectorial forces which may operate on a body.

The present invention is of a method, mechanism, device and system for converting environmental energy (especially of heat), with no need of a temperature differences from the first place in this environment, into a usable form of energy, as mechanical or electrical power, and this we achieve by utilizing the kinetic energy of randomly moving particles.

Specifically, the present invention can be used to obtain inexpensive readily available and environmental friendly electrical power.

The principles and operation of a method and apparatus to the present invention may be better understood with reference to the drawings and accompanying descriptions.

The Method

According to further features in preferred embodiments of the invention as described in drawings 3a–d, 5,6b–e, 12a–14d, the method method comprising the steps of the operation of a mechanism-10 which selectively blocks more particles-15 (particles—atoms, molecules, clusters thereof) that are moving in one general direction-16 (linear and/or rotary) related to the mechanism, than particles-15 that are moving in the opposite direction-17.

This selectively blocking of the randomly moving particles by their directions, is made here actually in the micro-level, in which the particles are blocked separately from the movement of the other particles, in this level each particle and particle has its own velocity and its own direction separately from the other randomly moving particles.

This method of selectively blocking the particles can be done in one-step of selectively blocking the particles by their direction, as described for example in FIG. 6b–e, which in there we are using a permeable membrane-50, covered on one side of it with a unidirectional molecular gates with a moveable part, and this gates are opening and closing by themselves at least part of the time, because their own kinetic energy and their small mass, and these gates are blocking particles-15 that are moving in one general direction-16 and coming from one side-A of the membrane-50, and let of passing through of particles-15 that are moving in the opposite direction-16 and coming from opposite side-B, or the selectively blocking of particles can be done in two steps: a) selectively diverting particles-15 by their direction, in FIG. 5 for example, we do it by using a magnet-90 that is diverting ions-15, b) blocking the diverted particles-15 which were moving in one general direction, by muzzles-106,108, that can be attached to a body-50,100,107, so more ions-15 will heat this muzzles from one side of them than from their other side, or alternatively for (b), not blocking the diverted particles-15 that are moving in one general direction, by muzzles-106,108, that other wise would do blocked these particles. This method of selectively blocking the particles, can provide energy in at least one of the following forms:

a) As described for example in FIG. 1,2,3a–c,4a, a vectorial force-$\Sigma F$ that can be used for move a body-50 that said mechanism-10 is attached to, For example as described in FIG. 5,31–37 for rotating a body/bodies-50,100,107.

b) As described for example in FIG. 6d–e, a flow of gases/liquids particles-V, that can be used for example for rotating a turbine-70.

c) As described for example in FIG. 6c, a pressure difference, between two sides of a body (also a surface)-50 that the said mechanism-10 is attached to, especially if the body-50 is a membrane, and that pressure difference can be used for different purposes, for example for moving a turbine as in paragraph (b) or for moving a piston, or for floating/lifting surfaces in the air/water.

d) A pressure, for example: for operating a compressor or for lifting, or floating, or flying, objects or moving pistons.

d) a subpressure, for example for sucking air/water.

All the mentioned above energy forms supplied, for different purposes are further more described in the Additions and expansions section.

The Mechanism

According to still further features in the described preferred embodiments, As described for example in FIG. 3a–d,4a–b,5,6b–e, the invention includes said mechanism-10 that substantially selectively blocks moving particles-15 by their direction related said mechanism. According to still further features in the described preferred embodiments, As described for example in FIG. 6b–e the mentioned mechanism-10 can comprising also a body-50 (also a surface and also in plural), which in or on it there is installed at least part of the mechanism-10 (as gates-54 attached to the surface-50), and this body-50 in some cases can be unseparated from said mechanism (also see FIG. 3a–d), and in some of this cases we may related to this body-50 as said mechanism-10 (for example as a unidirectional membrane).

Said mechanism-10 can comprising at least one of the following:

1) a unidirectional permeable surface (also a permeable membrane) that is permeable to the moving particles, and selectively blocks this particles by their direction. As described for example in FIG. 6e, in one form of the mentioned unidirectional permeable surface we use a permeable membrane-50, covered by a chemically process one side of it with a unidirectional gates-54 so they become unseparated from this membrane so it become as a unidirectional membrane.

2) As describes for example in FIG. 3a–d,4a–c21–30 a tiny unidirectional elements-45 that their smallest dimension (form x,y,z dimensions) can be from one single atom, till 1 mm, and can be with a moveable part-55 (see FIG. 21–30) or stationary (see FIG. 3d,4c), and can comprising at least one of the following: a) unidirectional gates-54, or b) unidirectional blocks-12, and etc.

3) As describes for example in FIG. 5, a magnet-90 (also an electromagnet) that operate in interaction with ions-15 and muzzles-106,108 (that can be also a rough surface), etc.

Also said mechanism at the all mentioned above paragraphs can comprising a muzzles (also in plural and can be also a rough surface)

Also as describes for example in FIG. 5, said randomly moving particles-15, at the all mentioned above paragraphs, can be ions-15, which most or all of them are from the same kind of electric charge (+ or −).

Figure 2:
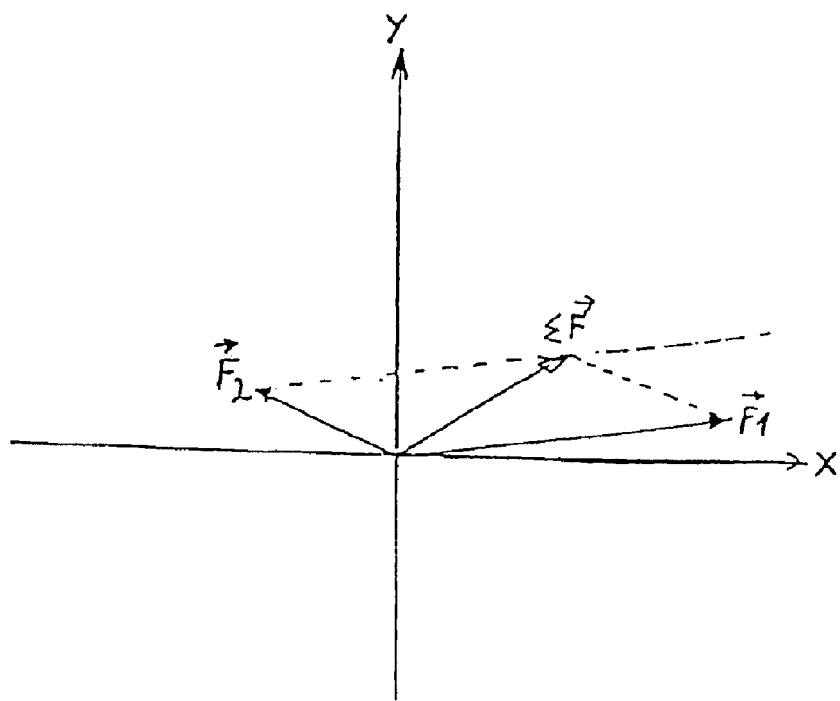
FIG. 2 is a graphic presentation of the vectorial forces which operate the body of FIG. 1.

The connection between the forces, the flow of particles and the pressure difference, that said mechanism is generating FIGS. 1 and 2 demonstrate forces F1 and F2 that operate on the body-50 (also a membrane) that in or on it there is installed at least part of the mechanism-10, and their equivalent vectorial force-$\Sigma Fx$, which do not depend upon statistical movement of the particles (such as in wind, etc.).

As described for example in FIG. 3a–d, 4a–c, 6b–e, the mentioned about equivalent vectorial force-$\Sigma Fx$ (see FIG. 3a–c) and the difference of pressure-dP4 on the body-50 (see FIG. 6c–e) and the general flow of the particles (see FIG. 6d–e), are all other aspects of the selectively blocking of moving particles-15 by the mechanism-10, ad the exact connection between these concepts is described in the calculations sheets. In general, the pressures difference is equivalent to the equivalent vectorial force-$\Sigma Fx$ multiplied by the active area of said mechanism-10 (the gates surface/the stoppers surface/the barriers surface, etc.).

The Device

Figure 36:
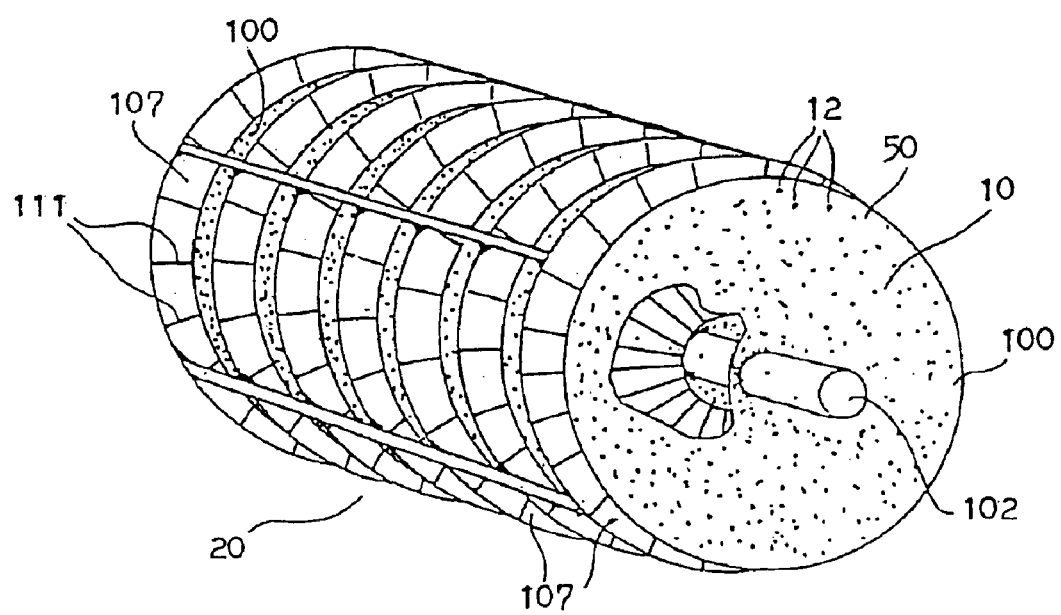
FIG. 36 is a three dimensional view of a device including molecular stoppers according to the present invention, implemented over the surface of a disc body which device includes, and an additional body having a matching configuration, which here includes passive blockers (stoppers) and which is not in direction contact with the first body.

According to further features in preferred embodiments of the invention, As described for example in FIG. 5,6b–e the invention include the mentioned device-20 comprising at least said mechanism-10, also said device-20 can comprising aid means as a body-50 on which the mentioned mechanism-10 is attached to, and one of the following aid means: a pivot-102, a magnet,-90 (also an electromagnet), a battery, and as described for example in FIG. 36, an additional barriers-111. The device enable using the energy we get from the randomly moving particles through the mechanism, by providing a frame to the mechanism operation.

The System

According to further features in preferred embodiments of the invention As described for example in FIG. 6e, the invention include a system-30 comprising at least the mentioned device-20, that is comprising the mentioned mechanism-10; and also the system-30 can comprise a randomly moving particles-15 (atoms, molecules, clusters thereof, etc.) that said mechanism-10 substantially selectively blocks this moving particles-15 by their direction. Also as described for example in FIG. 7a–b,8,9,35,37 this system-30 can contain some kind of a container-35 in which will be the mentioned device-20, and this container can be closed and sealed to the environment (see FIG. 7a–b,9,35, 37), or this container-35 can be opened to the environment (see FIG. 8), and also as described for example in FIG. 6e, this system-30 can contain some kind of a transmission system as a turbine-70, and an electric generator-72, and also a heat exchanger-133 (also measuring a heat absorber). Furthermore this quality of absorbing environmental heat can be used for supply a temperatures difference, or cold temp'. Also as describes for example in FIG. 5, said randomly moving particles-15 in the system-30, can be ions-15, that most or all of them are from the same kind of an electric charge (+ or −).

The Description of Different Kinds of said Mechanism Selective Barrier

According to one embodiment of the present invention, the mechanism include a selective barrier (also a membrane) which is selectively redistribute particles of a fluid (gas or liquid) that are moving across this barrier by the direction of this moving particles, related to the barrier surface. This selective barrier comprising a possibility of thin (less than 2.1 mm) non metallic surface, as ceramics for example, covered with a very thin plating of metal, that its maximal thickness is about 0.2 mm, so more little particles, like hydrogen molecules or Helium atoms or Neon atoms, will pass through it in one direction than in the opposite direction.

Tiny Unidirectional Elements

According to another embodiment of the present invention, As described for example in FIG. 3a–d,4a–c,, 6b–e,21–30, the mentioned before mechanism-10 is comprising a tiny unidirectional elements-45, that their smallest dimension (from x,y,z dimensions) can be from one single atom, till 1 mm, and this elements-45 are selectively block particles-15 of a fluid (as gas or liquid) by their direction, and this elements-45 can be with a moveable part-55 (see FIG. 21–30) which is mainly molecular size, or stationary (see FIG. 3d,4c), and this elements-45 can comprising at least one of the following: a) unidirectional gates-54 (see FIG. 3a–d,6b–e), or b) unidirectional blocks-12 (see FIG. 4a–c).

As described for example in FIG. 3a–d,4a–c,6b–e, this elements-45 can be on or in a body-50, preferably as a surface, which can be (not has to be) permeable to the moving particles-15, like a membrane, especially when we deal with said gates-54, and most or all of this unidirectional elements-45 are facing to the same direction, so that together selectively block more particles-15 that move in one direction-16 related to the mechanism, than particles-15 that move in the opposite direction-17, and thereby they generate a flow of particles-15 through the mechanism-10, and an equivalent vectorial force-ΣFx that operate on the mechanism-10 (also see FIG. 2), and also can generate a pressures difference across the mechanism, which thereafter employed to obtain a usable form of energy, as described in the methods section.

As described in FIGS. 3a–c, 4a–b, the mentioned above elements-45 can include a moveable parts-55 that blocks more particles that come from one direction-16 than particles from the opposite direction-17. For example as described in FIG. 3a, by using a tiny unidirectional gates-54, which include a moveable part-55, that will be installed on one side-51 of a permeable membrane-50, and facing to the same side-51 of this membrane-50, so they will selectively block more moving particles that come from the side they installed on-16, than moving particles that come from the other side-17.

The elements-45 can be created from body-50 itself or from parts-55 connected thereto. In any case they are defined herein as being connected to the body-50.

The mentioned above elements including said gates, or stoppers, or the body-50 itself, they connected to, can be manufactured from different kind of materials, mainly from carbons, silicones. And as described in FIG. 21–30 the gates-54 or the stoppers-12, preferably can be made of aromatic molecules that are based on Benzene, as PHENANTHRENE, CYCLOHEXANE, BENZENE, NAPHTHALENE, PHENALENE. Furthermore, As described in FIGS. 4a–b,21–24,27,29,30, for optimize their operation, the moveable part-55 of this elements-45 can be strengthened and stabilized, to the body-50 via linkers-155, 156,157, at its optimal position, for enabling the moveable part-55 to move by its own kinetic energy, and this linkers are made of chains of atoms, preferably of carbon.

Figure 19A:
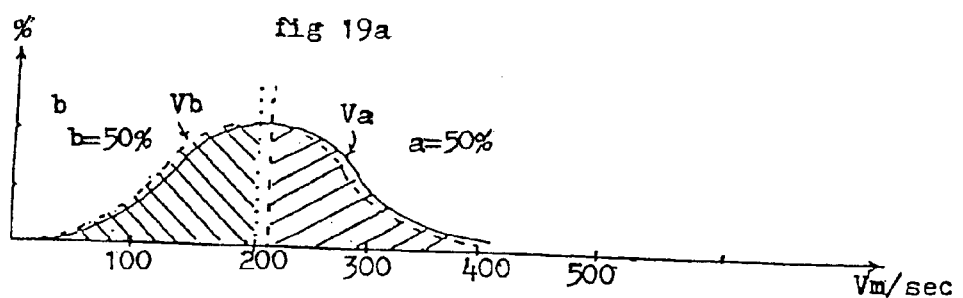
FIGS. 19a–b demonstrates the graph of the partition of the molecules by their velocity, including the moving particles and the gates/stoppers, according to the present invention.
Figure 19B:
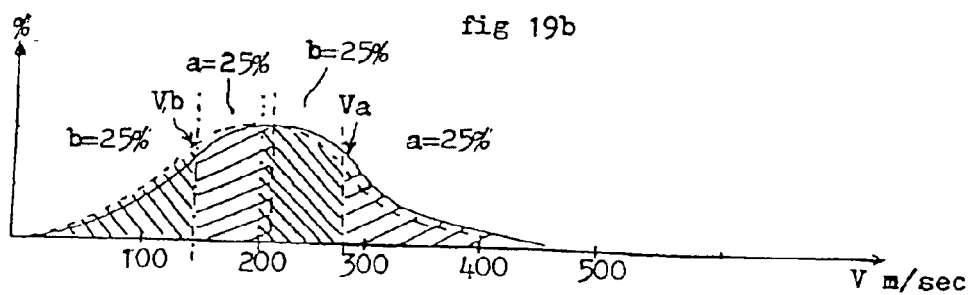

As one can deduce from the calculations made with respect to the mentioned gates operating system and from the graph of FIG. 19, for the best utilization of mechanism based on said elements (gates/stoppers) which include a moveable part, one should use particles having a molecular weight which is similar to the moveable parts weight of this elements (the elements mass can be between quarter of the particle mass till four times bigger than the particle mass).

Also as described for example in FIGS. 3d, 4c, this tiny elements-45 can be stationary, from different kinds, as described for example in FIG. 3d, they can be as stationary gates-54, or as described in FIG. 4c, they can be as stationary stoppers-12, as further described.

Tiny Unidirectional Gates

According to another embodiment of the present invention, As described for example in FIG. 3a–d, 6b–e, the mentioned above elements-45 can be a ting unidirectional gates-54 which their smallest dimension (from the three dimensions x,y,z) can be from one single atom, till about 1 mm. This gate-54 are selectively blocking particles-15 of a fluid (as gas or liquid) by their direction related to the mechanism position, and this gates-54 can be with a moveable part-55 (see FIG. 3a–c,21–30), or stationary (see FIG. 3d).

As described for example in FIG. 3a–d, this gates-54 can be installed on or inside a permeable membrane-50 (also a permeable surface), and at least most of them are facing to the same side of the member-51, and block more moving particles-15 from crossing this barrier from one side of it, than particles-15 that come across the barrier from the opposite side of this barrier, and thereby they generate a flow of particles-15 through the membrane-50, and an equivalent vectorial force-ΣFx that operate on the membrane-50, and can generate a pressure difference across the membrane-50, which thereafter employed to obtain a usable form of energy, as described in the methods section.

The size of the mentioned above moveable part-55 of the gates-54 is mainly molecular size and preferably bigger than the membranes-50 holes, and preferably with a similar mass to the moving particles-15 mass (the moveable parts-55 mass is preferably between a quarter till four times of the particles mass).

More detailed, in one way, as described for example in FIG. 3a, if this gates-54 includes a moveable part-55, they are covering one side-51 of a permeable membrane-50 (also a permeable surface), which they attached to, and at least most of them are facing to the same side they attached-51, and are opening mainly to this side-t1, so they selectively block more moving particles-15 that come from the side they attached to-51, than particles-15 that come from the opposite side of the membrane-52, and thereby the generate the mentioned above flow of particles, and the mentioned equivalent vectorial force-$\Sigma Fx$, and the mentioned pressure difference across the membrane-50.

In another more detailed way, as described in FIG. 3d, this gates-54 can be stationary, while in one form they can be build as holes in a surface-50 from one side to the other, while one opening of this holes is bigger than their other opening, and they are facing with their bigger opening to the same side of the surface-52, and they let more particles passing through the side of the bigger openings than from the other side of the surface, so as mentioned in the section deal with the method and the mechanism, they selectively block the moving particles by their direction related to the surface and as mentioned at this section they supply energy. The maximum width of the small said opening is preferably less than 10 microns. And the holes can be in various of shapes, for example as pyramids, or cones, or slits and etc., and their inside should be smooth.

The mentioned above stationary gates-54, can be manufactured in the surface itself-50, by using drills, or by tools with a very sharpened edges as very sharp pins, to punch the holes in the surface (for example by using a steel brash with very sharp edges), and it is preferred to worm the mentioned sharpened tools before punching the surface, also it preferably to flow a warm fluid as gas or liquid through this holes to smooth their internal side.

Gates 54 can be created from body 50 itself or from parts 55 connected thereto. In any case they are defined herein as being attached to the body. Gates 54 are installed in or on body 50, so that most or all of gates 54 are openable in only one general direction related the body.

FIGS. 6a–e demonstrate the principle of operation of this embodiment of the present invention.

Assume we have a box 35 which contains gas particles-15 (for example of Xenon) and is characterized by a given internal pressure (e.g., 1 atmosphere), as shown in FIG. 6a. And as we know the diameter of that gas atoms is about 3 angstrom, and the distance between that atoms is about 35 angstrom, and their velocity is about 200 m/sec, and each particle is clash other atoms for about $1*10^7$ in a second. But 95% of the time they are not clash between themselves.

As shown in FIG. 6b, further assume that box-35 divided by a permeable partition, 60, (as a membrane) into two sub compartments, 62- A and B. The partition 50 is permeable to moving gas particles-15, and has a pressure resistant.

Further assume, as shown in FIG. 6b, that partition 50 is covered on one side thereof with molecular gates-54. Gates-54 are selected to match in size to gas particles-15. And they caveres all the holes that at the surface side of the membrane-50 they attached to. Gates-54 open only to the side on which they are present. The diameter of the holes in the partition is about 4–10 angstrom (but can be different). So about 95% of the time no moving particle clash at each gate. And so this gates will let pass through of particles from subcompartment B to subcompartment A, but they will block of passing through of particles from subcompartment A to subcompartment B. So as shown in FIG. 6c, as a result will be accumulate of gas particles-15 in such compartment A, generating elevated pressure therein, whereas sub pressure is formed in the other subcompartment B. As shown in FIG. 6d, the difference in pressure may be used to released through a turbine 70 and thereby, e.g., using a generator 70. Also as described in FIG. 6d,6e we can say that the difference of particles blocked by the partition in one direction, to particles that blocked in the opposite direction, creates a general flow in only one direction, so the kinetic energy of the gas particles may be converted into a usable form of energy.

As shown in FIG. 6e, this process may be cycled to provide a continuous supply of usable power, and using a heat exchanger-133 (also meaning a heat absorber) which return back the heat energy to the gas particles when they passing through the turbine.

Force, energy profits, efficiency and capacity calculations concerning the operation of the configuration presented in FIGS. 6a–e are given in the calculations sheets. Olso said partition can be folded and bent in any shape.

In another application of the mentioned gates, we can use the mentioned membranes-50 with said gates-54, to move a piston.

Ting Unidirectional Stoppers

The said elements can be also a tiny unidirectional stoppers, that their smallest dimension (from the three dimensions x,y,z) can be from one single atom, till 1 mm, as described for example in FIG. 4. This tiny unidirectional stoppers, 12, are selectively blocks more particles moving in one general direction relates the mechanism than particles that move in the opposite general direction, and this tiny unidirectional stoppers are installed on or in a body (also a surface)-50, see FIG. 4c, and at least most of them are facing to the same common direction, related said mechanism, so they cause a general flow of particles because of their operation, so this unidirectional stoppers can be used for energy conversion.

Stoppers 12 may be of different kinds. As described in FIGS. 4a–b the stoppers can be movable. As described in FIGS. 4a–b,21–24,27,29,30, the stoppers can be strengthened and stabilized to the body-50 via linkers, 155,156, 157, made of chains of atoms, that enable the stoppers-12 to lie close to the surface in one direction, and prevent from the stoppers to lie in the other direction, so they can selectively block more particles-15 that come from one direction-16 than particles-15 that come from the opposite direction-17. If the stoppers are moveable their size is preferably molecular size, and preferably with a similar weight to the moving particles (the stopper mass is preferably between a quarter till four times of the particles mass).

The stoppers also may be stationary as described for example in FIG. 4c. Stoppers 12 may be integrally formed with or connected to surface-50, also they can be as sharp saw teeth facing one common direction. Stoppers 12 are designed to better restrict the movement of particles arriving from one direction as compared with particles arriving from the opposite direction, such that a force acting on body-50 is generated.

FIG. 36 presents a configuration of a device constructed and operated according to the above explanation. Device-20 includes a disk-100, which covered with said stopper-12, and there should be a stationary blocking muzzles-111, on another body-107, which prevent free movement of the moving particles to the opposite direction, and this device-20 may convert kinetic energy of fluid particles into a rotation.

Figure 16A:
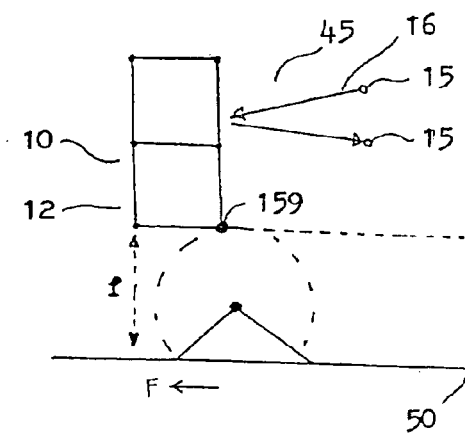
FIGS. 16a–b are schematic depictions demonstrating the stopper molecule according to the present invention.
Figure 16B:
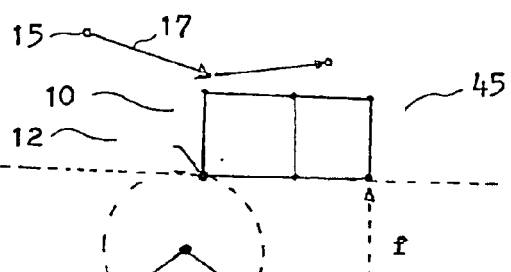
Figure 17A:
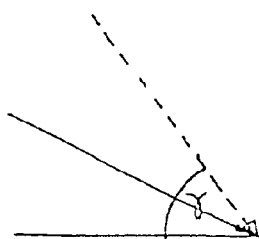
FIGS. 17a–b demonstrates the average effective collision angle.
Figure 17B:
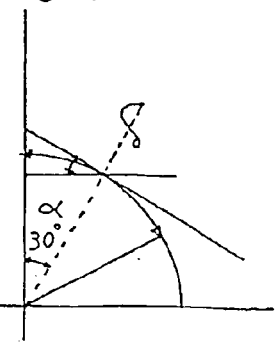
Figure 18:
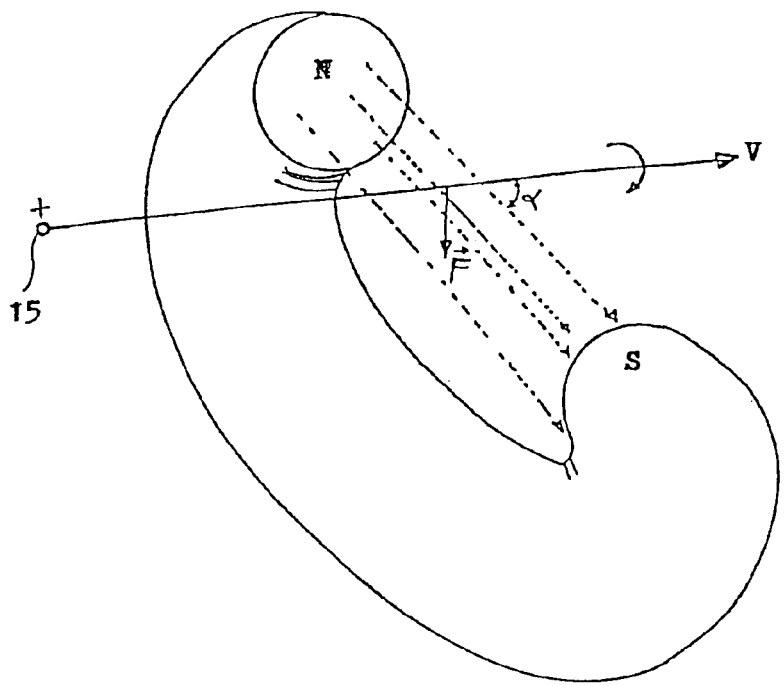
FIG. 18 demonstrates the force which operate on the ion in a magnetic field.

This phenomenon is further demonstrated in FIGS. 16a–b. Force, energy profits, efficiency and capacity calculations concerning the operation of the configuration presented in FIG. 4 are similar to those concerning the above-described gates, without the resistant of the membrane itself to the passage through of the moving particles.

Processes for Install Gates on a Surface

The following some of the processes that can be used for covers a permeable surface as a permeable membrane and the like, with gates on one side thereof. The membrane itself should be from a strong substance with a 3D firm structure of its molecules. The membrane should be strengthed with a crowded (not full) strong net. And said membrane will be permeable to the moving particles that will be used in the designated device, but it will not be permeable to said gates.

The membrane and the gates are preferably should be based on benzene (not have to be). Also during the following processes the gates should be adds to only one side of a membrane and keeping that they will stay only at this side of the membrane during all the process.

Most of chemists known how to install carbon molecules, such as the gates molecules (see FIG. 21–30 for example only) on a surface.

Process 1:
- (a) Preparing a very thin solution of gates, which are contain the group —CH3 (also about 1/10 of the gates can contain the group —CH=CH2), in pure boiling water.
- (b) add the mentioned above solution as thin layer to only one side of a membrane which is preferably based on Polisatiren, which is covered with groups of —CH=CH2, thereby add a small quantity of Benzoil Paroccid and shake a little during the process and keep the temperature as close to 100° C. for about 10 minutes and during this time add pure boiling water is needed, for preventing dehydration of the mixture.
- (c) Washing the membrane with water, and afterwards drying the membrane.

Process 2: An alternative process may also be employed.
- (a) Covering alternatively the membranes surface atoms with halogens (e.g., Cl, Br, I) atoms (while the distance between chlorinated surface atoms should exceed 2.5 Angstrom), by, for example contacting the surface with some solution of Halogens in an appropriate solvent such as alcohol, preferably under day light, or with Al Cl3 if the membrane is made on base of Benzene molecules, and limiting the time of contact the solution with the surface, or limiting the amount of the Halogen. The gates atoms are also have to be alternately covered with Halogen atoms [at least their bases-159 (as described for example in FIG. 10*a–c*, <–30)].
- (b) Preparing a thin solution of the gates in an appropriate solvent such as Alcohol, Ether or the like, and adding a metal ions such as Mg/Na/K to this solution.
- (c) Contacting the mentioned above solution with only one side of the surface, thereby chemically attaching the gates to the surface.
- (d) Washing the surface from the remaining halogen atoms and other substances with solution of alcohol with KOH/NaOH and afterwards with water or the like.

Process 3: An alternative process may also be employed as process 2, when in paragraph (b) there will not be added metal ions to the gates solution, and instead of this, the chosen side of the surface will be covered with Magnesium atoms by contacting this side with a Magnesium solution in Ether, for creating a 'Griniar component', and afterwards the surface will be washed with Ether.

Process 4: A detailed alternative process for install the gates on a permeable surface, such as a permeable membrane and the like, may also be employed. The gate molecules which are preferably will be made of Benzene derivatives, as described for example in FIGS. 21–30, 40–43.

- (a) Prepare a solution containing about 5% chlorine dissolved in about 400 ml of C–C14 or C2–C16. Add about 4 grams of chloro-aluminum powder (AlCl3), and max. Then, apply the mixture to the membrane surface, itself based on Polystyrene, or the like, for about 30 minutes. Thereafter, the membrane is washed, with ether for example.
- (b) Mix about 5 grams of magnesium powder with a diluted solution of about 10 ml of the gates (as described) in about 500 ml of ether or the like (not water). The gates include base atoms-159, as shown in FIGS. 21–30, and further includes strengthening and stabilizing chains-155,156,157,158 hanging therefrom. Chlorine atoms are provided conjugated to some of the base atoms-159 and to the base chains atoms-160. The distance between chlorinated base atoms should exceed 2.5 Angstrom. In a non-water environment this mixture has to remain for about 30 minutes to achieve a Griniar reaction (R-Mg-Cl).
- (c) Immerse the membrane in ether or the like (not water), and add the solution of the above-mentioned gates mixture in a thin layer to only one side of the membrane for about an hour ensuring no contact of the mentioned solution with the other side of the membrane.
- (d) Get out the membrane and wash it with ether. Immerse the membrane in solution of alcohol with KOH/NaOH for about half hour. Wash the membrane with refined water. Dry the membrane in a dry flow of very clean air.

Process 5: Alternatively to process (3), at the end of section (a) one can add a solution of about 4 gr of Magnesium powder, in about 200 ml of Ether, for about half hour, and Wash the membrane in Ether. And section (b) will be executed when there will be no added of Magnesium powder to the gates solution.

In general one can use Br instead of Cl and further use different temperatures and illumination to assist the above-mentioned processes. At the end of the processes one can covering the surface and the gates with fluorine atoms, by, for example contacting of the surface with the fluorine atoms (as gas or a solution).

Process 6: Alternatively to process 3, one can use Na/K (for Virts process) instead of Mg, and sections (b) and (c) will be united.

Another possibility to attach the membrane the gates can be cone in a system as described for example in FIG. 6*d–e*, when the attach of the gates to the membrane will be not permanently, and there will be a filter at the connecting point, 67, of the pipe that goes to the turbine, 70, to keep the gates remaining at the same side of the membrane. The gates can be attached to the membrane comprising one of the following or the like:

1) Attach a magnet/electromagnet to the side of the membrane that not covered by the gates, or place that magnet at that side of the membrane, alternatively the membrane itself will be magnetic. The gates has to be containing ferromagnetic substance or be magnetic.

2) The membrane surface will be covered with strong polarity substance like fluorine. The gates themselves will contain at least one of their edges a polarity substance as fluorine or the like.

Figure 38:
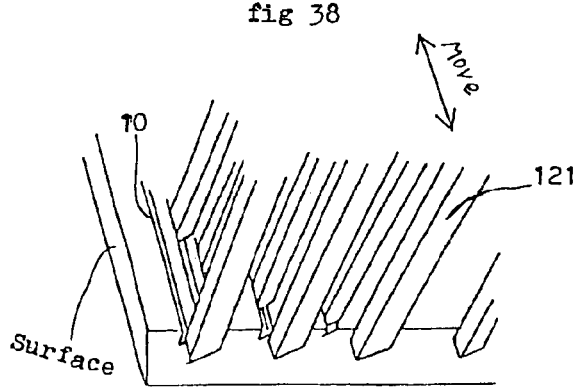
FIG. 38 demonstrates the action of a brush for manufacturing the stoppers according to the present invention.

One can also manufacture the gates from the permeable surface itself, by using means to roughen or engraving one side thereof with a file, or a sandpaper, or a surface plated with diamond dust, or a brush as described in FIG. 38, with a very sharp edges, 121, which made of very hard substance like steel, or a delicate engraving tool as a narrow laser beam or an engraving knife, etc. Thereafter the mentioned plated surface with the sharp protrusions or the engraving tool, will be moved with little pressure applied, a great number of times against the permeable surface. The number of times is related to the density of protrusions per 1 mm. The preferred calculation is: $y=400,000/(n*x)$ n-is the number of protrusions/sharp edges per 1 mm^2.

x-is the width of the plated surface with the sharp protrusions/sharp edges.

A similar result may be obtained by sand blasting or diamond dust blasting the surface. Chemicals can be used to refine and delicate the gates. Preferably while modifying the gates as described heat is applied to ease and improve the operation.

Processes for Install Stoppers on a Surface.

To the process of connecting the stoppers to the surface one may use the same processes as used to connecting the gates to the surface with the next changes and additions:

1) The body/surface does not have to be penetrable at all.
2) One of the edges of each of the stoppers is provided with a substance, x, which permits the application of a vectorial force onto the stopper, during this process. One example for substance x is a Fluor atom which creates strong polarity and can be maneuvered under an electrical field. Substance x is removed after the attachment process is completed
3) the connected processes will be executed during using of some vertical force, that can be also a chemi force or outside force (for example gravity).
4) The process of connecting the stoppers to the body (also a surface) recommended to execute by two main stages:
   a) The stoppers will be connecting with one chosen atom, that is on their base or on their base chains, to the surface, through the chemically processes as detailed before, without acting any force on them.
   b) repeat of all the connecting process, during operate some vertorial force on the stoppers.

A detailed process for install the stoppers on a body such as a surface, may also be employed. The stoppers molecules are preferably will be made of Benzene derivatives, as described for example in FIGS. 21–30. The stoppers include base atoms, c, as shown in FIGS. 21–30, and further includes strengthening and stabilizing chains hanging therefrom. Chlorine atom is provided conjugated to one of the base atoms and to one of the chains atoms. One of the edges of each of the stoppers is provided with a substance, x, as said before, for example the substance x can be a Fluor atom.

(a) Prepare a solution containing about 5% chlorine dissolved in about 200 ml of $C-Cl_4$ or $C_2-Cl_6$. Add about 4 grams of chloro-aluminum powder ($AlCl_3$), and mix. Then, apply the mixture to the surface, itself preferable based on Polystyrene, or the like, and its size is about 20 cm/20 cm (related to the amount of the mixture), this solution remain for about 30 minutes. Thereafter wash the surface for example with ether.

(b) Mix about 5 grams of magnesium powder with a diluted solution of about 5 ml of the stoppers (as described) in about 500 ml of ether or the like (not water). In a non-water environment this mixture has to remain for about 30 minutes to achieve a Griniar reaction (R-Mg-Cl).

(c) Add the solution of the above-mentioned stoppers mixture in a thin layer to the surface for about an hour. And afterwards wash the surface with ether.

(d) Prepare a solution containing about 5% chlorine dissolved in 20 ml of $C-Cl_4$ or $C_2-Cl_6$. Add about 4 grams of chloro-aluminum powder ($AlCl_3$), and mix. Then, apply the mixture to the surface, this solution remain for about 10 minutes. Thereafter, the surface is washed with, for example, ether.

(e) Mix 5 grams of magnesium powder in about 500 ml of ether or the like (not water). In a non-water environment. Add this solution the surface, during activated the mentioned vectorial force that is appropriate to the x substance, and this force will remain all the time process for about 60 minutes. Thereafter, the surface is washed with, for example, ether.

(f) Immerse the membrane in solution of alcohol with KOH/NaOH for about half hour. Wash the membrane with refined water. Dry the membrane in a dry flow of very clean air.

In general one can use Br instead of Cl and further use different temperatures and illumination to assist the above-mentioned processes.

Alternatively if using Na/K (for Virts process) instead of Mg, sections (b) and (c) will be united.

The vectorial forces and the appropriate x substances are listed here in below:

1. Electrical force—using a very strong electrical field, the substance x is as Fluor the like.
2. Friction force—by flowing the solution in some velocity at the desirable direction on the surface, the substance x is a heavy atom element, such as lead.
3. Friction force—by flowing the solution in some velocity at the desirable direction on the surface. The substance x features attract polarity to the solution, and is preferably heavy, like chlorine, bromide cesium or lead.
4. Centrifugal force—by putting the surface at the desired direction in a centrifuge and operate the centrifuge. The substance is a heavy atom element, such as Lead or Iodine etc.
5. Magnetic force—using a very strong magnetic field. The substance x is a Ferro-magnetic substance like Iron or with some magnetic polarity as tiny magnets.
6. Chemical force—using a surface with atoms arrange in some direction (as like as crystal), so that the stoppers can be connected to the surface in only one direction.

One can execute the all above mentioned processes n different kind of temperatures.

Also one can use a combination of the mentioned above forces.

The stopper molecules may be polymerized before the above-mentioned process. Thereafter, they can be disconnected as necessary.

In another embodiment an extension exists between the x substance and the stopper's edge.

Figure 39:
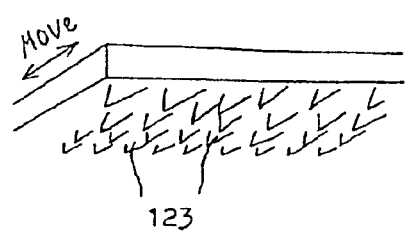
FIG. 39 demonstrates the action of a teeth for manufacturing the stoppers according to the present invention.

One can also manufacture the stoppers from the surface itself, by using the means to roughen or engraving the surface, exactly with the same means that use to manufacture the gates as maintained before from the surface, just that in the case of manufacture the stoppers there no need of a membrane or any other permeable body, and at all the processes to roughen or engraving the stoppers from the surface itself, the edges of the engraving tools will be made of very hard substance like steel, and the edges will be positioned in a sharp angle with respect to the treated surface (recommended less than 60°), and this tools as described in FIG. 38,39, will be moved with a little pressure against the surface when the edges will be in always at the same direction relatively to the surface. As described in FIG. 38, The mentioned above tool can be a brush with very sharp edges, 121, and will be used as mentioned above. Also As described in FIG. 39, we can use a surface plated with very sharp teeth, 123, that are made of a very hard substance like steel, and will be use as mentioned above.

the stoppers as described can be heat is applied to ease and improve the operation.

One can also manufacture the stoppers from the surface itself, by using exactly the same means that use to manufacture the gates as maintained before from the surface, just that in the case of manufacture the stoppers, the body does not have to be permeable to the particles, and after finished roughen or engraving the surface, one can do one or more of the followings:

(a) Blow a liquid/gas on the surface, at one direction perpendicular to the above. The liquid/gas is preferably warmed to about 160° C. Should nylon be of choice, temperature may even be 200° C., such that the surface and blockers become workable.

(b) Alternatively to (a) use a mild solvent instead of warm gas/liquid to turn the surface and the blockers (stoppers) workable.

(c) Alternatively to (a) use a sponge saturated with warm liquid at the above-mentioned temperatures and move it to the same direction.

(d) One side of each of the stoppers may be chemically modified as desired using a suitable light sensitive chemical reaction conjugated to a single sided illumination with appropriate light from appropriate angle.

At all the methods of connecting the gates/stoppers to one side of the surface or to manufacture them from the surface (also a body) itself, one can smooth the second side of the surface even before the mentioned above processes, and also the second side can be plated with fluorine.

Calculations of the Efficiency and the Power of Membranes with Gates data:

the moving particle—a—$C_2F_6$—molecular weight=138;

the gate—b—$C_{12}H_4$—molecular weight=148;

P=1 atmosphere; T=273° k.

As demonstrated in FIG. 13, when the moving particle come from side A, and collide the gate, it can't passing through the gate and the membranes face, no matter if the gate is get open, or get close.

But when the moving particle come from side B, and collide the gate, when the gate is get open (about ¼ of the time), it is can passing through the gate and the membranes face, because they have the same mass and the same linear velocity, and since we take in a count only particles which have the same velocity as the gates and particles which their velocity is not higher by 25% more then the velocity of the gates, so in our calculation the average of the particles that are passing through the gates from side B to side A is remain as average velocity.

Since the velocities of the gate and of the moving particle are not constant, we have to calculate the percent of the number of times that the particle and the gate are moving in a close velocity as required (see FIG. 19).

$$x\% = [(50+2.5)*(50+2.5)+(25+2.5)*(25+2.5)+(25+2.5)*(25+2.5)]/100 \quad x\%=42.7\%$$

In FIG. 11, the opening segment of the gate is δ(Delta), while the used segment in the gate motion from its movement is α (Alfa) (¼ of the time for one circulation of closing and opening of the gate). The effective clashing segment direction of a moving particle at a gate is γ (gamma). When the gate is wide opening (¼ of the time for one circulation of the gate motion ) the particles can move in both directions with no interference, and that we take in the later calculations.

η—the efficiency of a gate while clashed by a moving particle.

η=(⅓ *x%/100*gamma/180)=0.035.

An assumption is made to simplify the calculations—the gate and the particle are moving perpendicular to the surface.

In Work State (FIGS. 6d–e)

The membrane, 60, covered on one side of it with the unidirectional gates, 64, is divide a close container, into two separated sub-compartments, and this two sub-compartments are connected between themselves with a turbine, 70, and a heat-exchanger and a connecting pipe, that connect between all of this parts, and all of this when there is given that: when the number of the activated gates is 20% from the all membrane surface, and the other gates that covered the membrane are not activated and sealed to the passing through of particles.

S—the all surface area of the membrane is 2500 cm^2

S1—the area of the active gates, which is 20% of the membrane area dX1—the amount of the gas that passing through the gates as result of their operation.

myu—the permeability of the membrane itself, with no connection to the gates or to the member surface, and is 0.05.

myu1—the permeability of the gates in both directions to the particles when they are wide open.

estimate—myu1 is 0.3, so only 0.3 of the particles can pass the gates when the gates are wide open Va—the average velocity of the moving particles V—the statistical velocity of all the particles in the system related to the membrane.

V1—the statistical velocity of all the particles through the membranes surface (not through the all membrane thickness), as the result of the gates operation, with no connection to the membranes thickness V1=Va * η * myu1 * S1/S=221 * 0.035 * 0.3 * 0.2=0.464 m/sec dX1=S * V1=0.25 * 0.464=0.116 m^3/sec As the result of the gates operation on the gas particles that going through them, there created a pressure differences between the two sides of membrane surface.

The gates, as result of their self movement, are widely open about quarter of the time, and at that time gas particles can pass through freely in the both directions, and the difference of pressure that will be created on the membrane surface, will cause to the return back of some of the gas particles from the high pressure to the low pressure through the gates in segment d, in FIG. 11, at that quarter of time, so the final pressure difference will be lower than the maximum.

dt—the time in which the gates are wide open

S2—the effective area of the gates depending the time in which some of the particles are going back because of the pressures difference $$S2=dt * d/180*S1=0.25*0.3*0.2*0.25=3.75*10^-3 \text{ m}^2$$

Vrev1—the velocity of the particles that return beck through the membrane, because of the pressures difference.

dP1—the final pressures difference on the membrane surface (at zero distance from the membranes surface), at the pressures balance point, that created as result of the gates operation, and the reversed particles, and the general gas flow through the turbine and the heat-exchanger and back to the membrane, see FIG. 6d.

Vrev1=Va* (dP1(at')/1at') *myu1*S2/S

Vrev1=* (dP1 (at')/1at') * 0.3 * 0.00375/0.25

Vrev1=0.9945 (m/sec)*(dP1 (at')/1at')

dX2—the amount of gas that return back through the gates at the time they are wide open, with no connection to the membranes thickness.

dX2=S * Vre1 dX2(cm^3/sec)=0.25*0.9945*(dp1(at')/1at')

dX2(m^3/sec)=0.2486*(dP1(at')/1at')

dX4—the amount of gas that make passing through the turbine, the heat exchanger, and back through the membrane (FIG. 6e).

Practically the lowest permeability in the system, is determine the gas general flow velocity.

The heat-exchanger in practice has no resistance to the gas flow.

Since we use some of the kinetic energy of the gas through the turbine, so its internal energy and its heat decrease too. The turbine permeability to the gas flow in practice can be between 0.7 to 0.98 according the needs. Here we determine that the turbine permeability is myu4=0.9.

V4—the velocity of the gas flow through the turbine (m/sec).

S4—the area of the turbine through it the gas is flow.

If we assume that the diameter of the turbine is 30 cm, than its area is 0.0707 ^2.

dX4—the gas volume that passing through the turbine in a second.

V4=Va*(dP4 (at')/1at')*myu4=211*(dP4(at')/1at')*0.9

V4=198.9* (dP4(at')/1at')

dX4=S4*V4=0.0707*198.9*(dP4(at')/1at')=14.062*(dP4(at')/1at')

dX3—the gas volume that passing through the all membrane in a second.

V3—the gas velocity through the all membrane.

S3—the membrane surface, equal to 0.25^2.

dX3=dX4

V3=V=dX3/S

V3=Va*(dP3(at')/1at')*myu=221*(dP3(at')/1at')*0.05

V3=11.05*(dP3(at')/1at')

dX3=V3*S=11.05*(dP3(at')/1at')*0.25=2.7625*(dP3(at')/1at')

1) dX3=dX4=dX1—dX2=0.116–0.2486*(dP1(at')/1at')
2) dX3=dX4=2.7625* (dP3(at')/1at')
3) dX3=dX3=S4*V4=14.062*(dP4(at')/1at')
4) dP1=|dP3|+|dP4|
4) in 1) dX3=dX4=0.116–0.2486* (dP3(at')/1at')—0.2486*(dP4(at')/1at')
2) in 3) 2.765* (dP3(at')/1at')=14.062* (dP4(at')/1at') dP3=5.09* (dP4(at')/1at')
2) in 1) 2.7625* (dP3(at')/1at')=0.116–0.2486*(dP3(at')/1at')–0.2486*(dP4(at')/1at')

(dP3(at')/1at')*3.011–0.116–0.2486*(dP4(at')/1at') 5.09* (dP4(at')/1at')*3.011–0.116–0.2486*(dP4(at')/1at') 15.5746*(dP4(at')/1at'*)=0.116 dP4(at')=0.00745 at' dP3(at')=5.09*0.00745=0.0379 at'
2) dX3=dX4=2.7625*0.0379=0.1047 m^3

V4=dX4/S4=0.1047/0.0707=1.481 m/sec

F4=dP4*S4=0.00745 at'*707cm^2=5.267kg=52.67 nt

P=(F*S)/t=F4*V4=52.67*1.481=394 w

For Conclusion

If we will put in the container 20 membranes that will be operate in parallel, so the area of the membrane will increase 20 times and will be 5m^2, and be build as spiral or the like for save space, when the total pressure difference will remain the same, and the power that we will et from the system will be increased 20 times to P2=7.880 w.

Magnet and Ions

According to a fourth embodiment of the present invention, as shown in FIG. 5, for example, the device can comprising a magnet 90 (e.g., at least one magnet and/or electromagnet) that may be used to create a magnetic field to further assist in separating (selectively diverting) moving ions according to their direction, and block the pulled ions by muzzles (meaning also a rough surface) 106 attached to a body 100. The magnet 90 will reject ions which come from the opposite direction so they will not be blocked by the said muzzles 106 from their other side, this rejected ions can be blocked by other muzzles 108 that can be placed on another body, 107, that covers as a casing the first body, 100. The difference in the number of moving ions, which are blocked by muzzles 106 from one side, compared with the other side, will create a vectorial force which will operate on the muzzles 106 and will bring about a rotational movement around an axis 102. With the casing body, 108, we: (a) prevent a free circulation movements of the rejected ions that cane't be use (b) with the muzzles, 108, on it, we prevent a free motion of ions around the first body, 100, and returning back this ions to the desired direction, 111, so it complete the work of the first body, 100.

Figure 32:
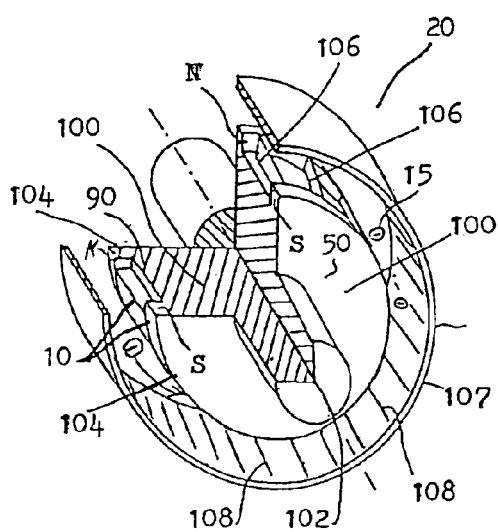
Figure 34:
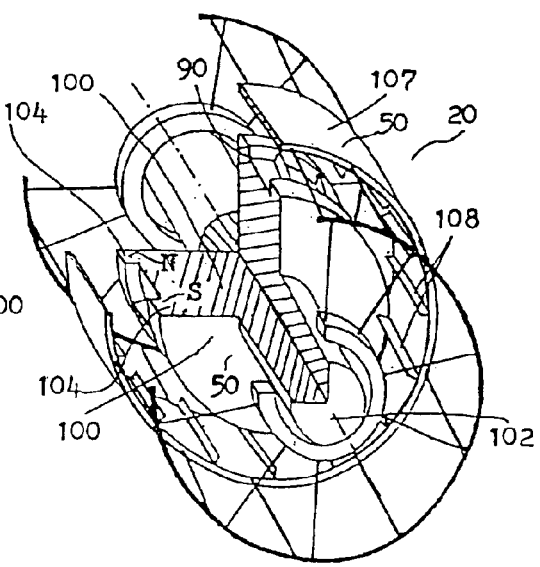

As shown in FIGS. 32,34 there we use two bodies. One body 100 shaped as a cylinder rotating on an axis 102. The body 100 includes a magnet 90 (also an electromagnet) having magnetic poles, 104, N and S, and present on the cylinder 100. A casing 107 is also provided and should be covered with muzzles too. At least one of the bodies involved, i.e., the cylinder or casing is equipped with muzzles 106,108 such that operating magnet 90 will bring about a mechanical movement, or a flow of ions.

Figure 31:
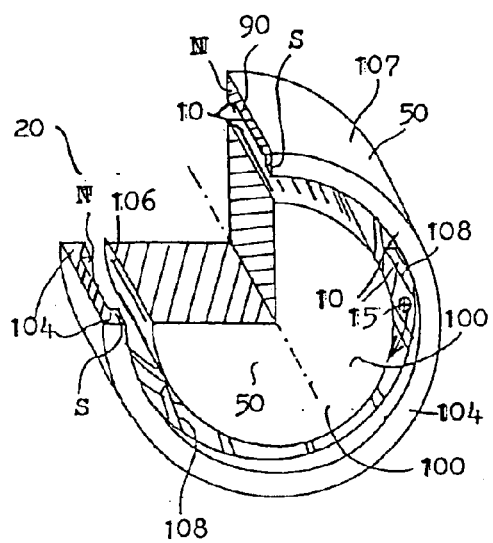
FIGS. 31, 32, 33, and 34 are three-dimensional views of devices operating with two bodies of which at least one is also a magnet or an electromagnet, and at least one includes different kind of muzzles.
Figure 33:
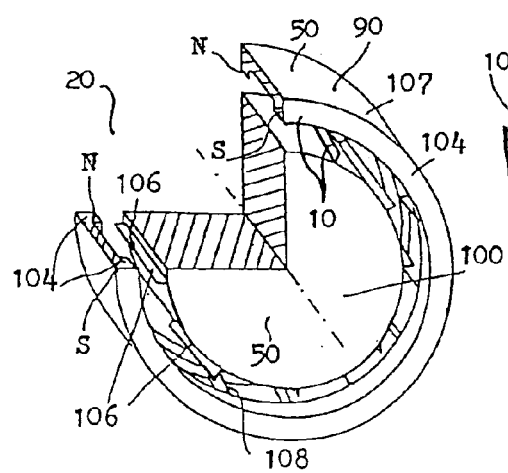

Also as shown in FIGS. 31, 33, there we use two bodies. One body 100 shaped as a cylinder and should be covered with muzzles. A casing 107 is also provided and should be covered with muzzles too, and includes a magnet 90 (also an electromagnet) having magnetic poles N and S, and present on the implemented therein. At least one of the bodies involved, i.e., the cylinder or casing is equipped with muzzles 106,108 such that operating magnet 90 will bring about a mechanical movement, or a flow of ions.

The mentioned above muzzles can be in different kinds of shapes, for example like: projections, rough surface, teeth, grooves, etc.

An ion generator may be provided with the device to replenish the ions.

Energy Calculations for a Device Based on Magnets and Ions

According to FIGS. 5, 18, and 31–34:

A magnetic field influences a linearly moving charged particle (ion) to bend its course of movement along a circle having a radius R (FIG. 5):

R'>R=½ R'

R'—Radius of the device=10 cm

R=½*0.1=0.05 m

If for example we will use nitrogen ions, than:

m=4.69*10$^{-26}$ kg

B—The magnetic field

R=(m*V)/(q*B)

B=m*V/q*R=(4.69*10$^{-26}$* 400)/(1.6*10$^{-19}$* 0.05)

B=1.2956*10$^{-3}$ (Wb/m$^2$)

The magnetic field can pull moving particle and block them using muzzles, to utilize their kinetic energy to move the body to which the muzzles are attached.

n—the fraction of kinetic energy utilized.

Since there are no seems loses, n=1.

Pressure=1(at)*n=1(at)*1=1 kg/cm$^2$

Assume that the effective area of the muzzles is S1=20,000 cm$^2$

F—the force which operate on the device.

V—the statistical velocity of all the particles from the surface during it's working, which is also the maximum velocity of the surface, it is has stationary muzzles, 108, FIGS. 31,33, which prevent free movement of the moving particles to the opposite direction.

F=S1*Pressure=2000*1=2000 kgr=20,000 Newton
V=Va*n=400*1=400 m/sec
P—the capacity which we get from the device.
P=(F*S)/t=F*V=20000*400=8*10$^6$ w=10666.6 Hp Thus, one can obtain maximum 10.666.6 Hp from a small device. And this power for small devices one can get from the sea or rivers, there is water without limitation, wherein concentrated about 300 kcal to 1 liter of water, and to the water one can be added a resistant freezing liquids like alcohol.

Additions and Expansions

Herein were been described some examples for the execution of the idea of converting ambient heat into a usable form of energy, employing the kinetic energy of particles in fluids such as gases or liquids. The devices described herein may translate the kinetic energy of such particles into a mechanical energy, either linear or rotational movement.

Additions for the device

A moveable device-20 which operates according to the given examples (especially if it based on said unidirectional stoppers or on said magnet and ions) as described in FIG. 5,20,31–34, 36, may include one or more parts-100,107 (bodies) which may move one relative to the other, and at least one part-100,107 should be connected to the mechanism-10, that cause the selectively blocking the particles by there direction, and thereby exploit the kinetic energy of fluid particles-15. If the device-20 is moveable, it preferably include two bodies-100,107, i.e., a first body-100 and a second body-107, the bodies may perform complementary actions. In other words, if the first body-100 is mobile, then the second body-107 will be stationary, or alternatively the second body-107 will move to the opposite direction of the first body. Each of said bodies-100,107 can carry muzzles-106,108,111.

All the mentioned before muzzles-106,108,111 can be indifferent shapes like: rough surface, projections and grooves especially vertically to the movement of the body, and the like.

The fluid particles should be chemically inert to the device and it's components in contact with the particles.

Additions for the system

As described in FIGS. 6e,7a,7b,35,37, the system-30 with all kinds of mechanisms can be a closed system, wherein ambient heat is absorbed by the particles (gas or liquid) through the system's walls-35. And also this system can be sealed, for enable increasing it's internal pressure (if the particles are as gas, not as liquid) for increase the power. Also as described for example in FIG. 7a,7b,9, the system-30 can comprising a generator-72, which to it there is connected an electric cable-77 that is getting out of the system-30, for preventing any pressure looses. Also as described in FIG. 9, the system-30 can contain a gas-cylinder-79, for continuous supply of gas-15, for covering of any gas-15 loses from the system.

Figure 35:
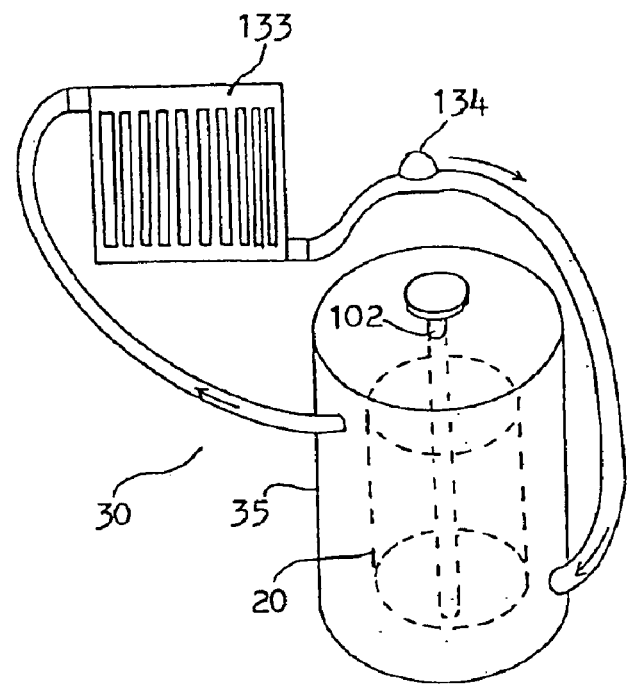
FIG. 35 is a three dimensional view of a system including a rotational device and a heat exchange implement according to the present invention.
Figure 37:
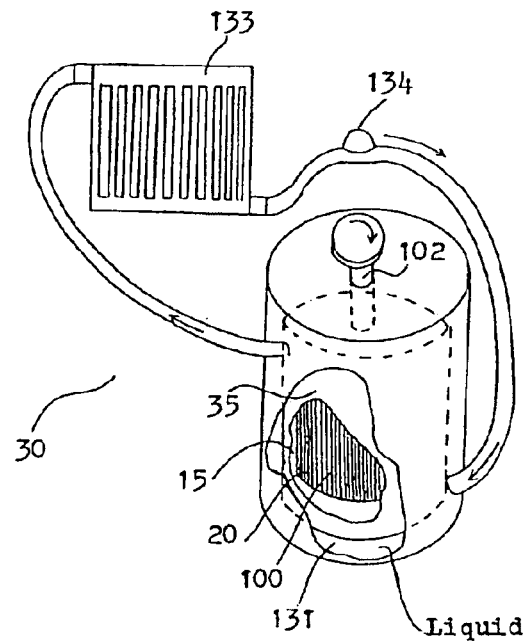
FIG. 37 is a three dimensional view of a device including a heat exchange implement according to the present invention.

As shown for example in FIG. 6e,35,37 the system can use a heat-exchanger-133 (also mean a heat absorber), preferably with a bellows to increase its efficiency and the power that we get from the system-30, and as shown for example in FIG. 35,37 the system can use a pump-134 to pump the particles-15 from the device-20 to the heat exchancher and returning back to the device-20 in a circulation.

Figure 7A:
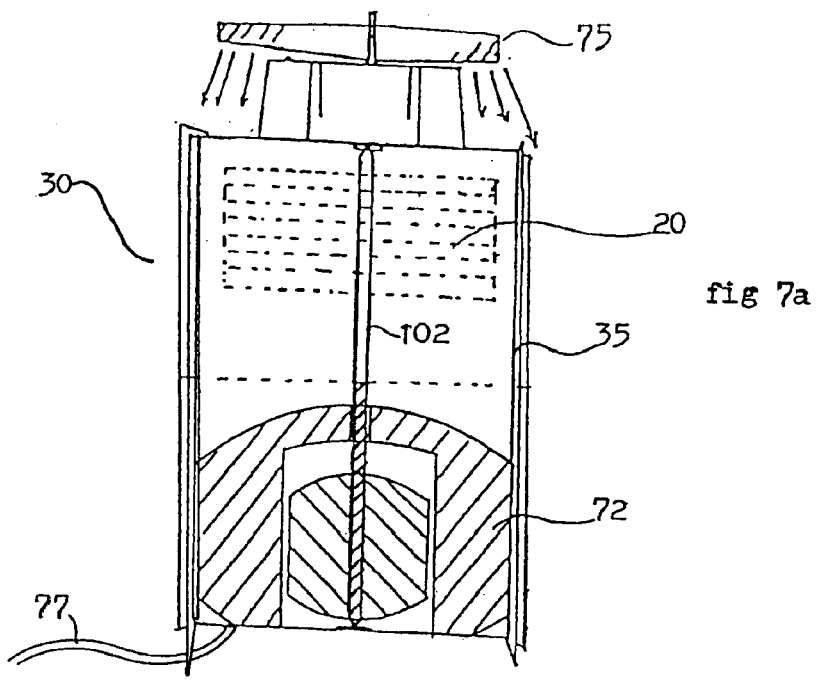
FIGS. 7a–b is a cross sectional view of a closed a closed system heated by a fluid flowing across it's external surface, provided with an electricity generator.
Figure 7B:
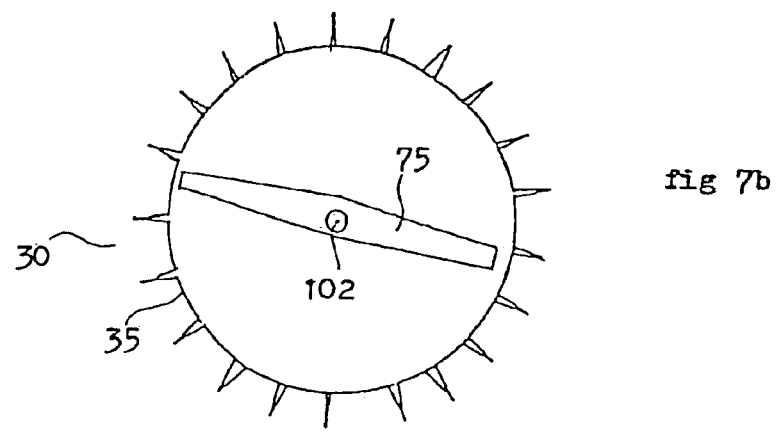

As shown in FIG. 7a,7b, the system-30 may include a ventilator-75, or a blower-75 or a pump-75, for improving the heat absorbing from the environment, through the system walls-35, to provide a continuous supply of usable power to the device-20, within the system-30.

As described in FIG. 37, the system-30 can use a mediator liquid-131, that will be used when we dont want that the internal particles-15 that come in contact with the device-20, so this liquid-131 will be flowed on the external surface of the internal container-35, that contain the device-20, and carry on to a heat-exchanger-133, and return back to surround the internal container-35, and keep going in circulation using a pump-134. It can be used for all kinds of the mentioned devices and mechanisms (using: magnets+ions, stoppers, gates, unidirectional membranes, and etc.), for increasing the internal gas pressure in the system, and especially it can be used in the mentioned before mechanisms that inclusive magnets and ions.

Figure 8:
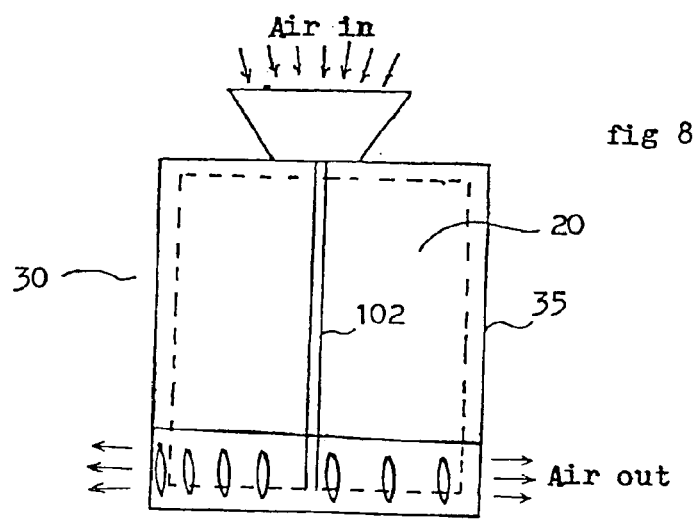
FIG. 8 is a cross sectional view of an open-system with a filter for permitting the entrance of a fluid into the system.
Figure 15:
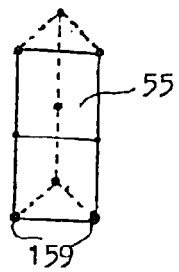
FIG. 15 is a schematic depiction of a stopper molecule according to the present invention.

As shown in FIG. 8, alternatively, the system-30 according to the present invention may be an open system. In this case, the gases and/or liquids from the environment are coming direct contact with the device-20. There is therefore no need of artificial "heating", but the device, and any part of the system-30 which is in contact with the gases and/or the liquids from the environment, must be chemically-insert to them. Furthermore one would preferably filter the gases and/or the liquids from the environment, to prevent fast powdering of the device's delicate parts.

The quality of all said before devices and the systems of absorbing the environmental heat, can be used for provide temperature difference, and cold temperature, and in conventional engineering heat systems, and it can be used among other things for cooling refrigerators or in air conditioning.

The system can also include a device for storage electricity which contain accumulators and the like, for storage remaining electric energy for use when it needed, such as in very cold night. Also the system can be include different kinds of sources of energy additional the environment heat, for example: a Photo-cells, benzine generations or engines etc.

A system according to the present invention has many utilities:

(a) Connecting the system to a generator may be used to provide electrical energy for homes, businesses, factories, electric-cars and more.

(b) The system can be used to directly operate different kind of other mechanical devices, such as motors, propellers, pumps, cars, etc.

(c) The system can be very useful for air-conditioning.

The following embodiments are considered to be part of the present invention:

A method for using environmental heat (with no need of temperatures difference from the first place), by converting kinetic energy of randomly moving particles (as atoms/molecules clusters thereof) in gas or liquid for example, into a usable form of energy, comprising a mechanism that selectively blocks more particles that move in one general direction, than particles that move in the opposite direction (for example, a unidirectional permeable membrane), such that an equivalent vectorial force, $\Sigma Fx$, acting on said mechanism is generateable, and can provide at least one of the following:

a) A vectorial force that can be used for move a body (as rotor for example) that the said mechanism is attached to;

b) A flow of particles, that for example is can be used for operating a turbine;

c) A pressure difference, between two sides of a body that the said mechanism is attached to, especially if the body is a membrane, and that pressure difference can be used for different purposes, for example for moving a piston;

d) A pressure;

e) A subpressure;

Such method, wherein at least some of the kinetic energy of the said particles, is used for selectively separating between this particles, through the said mechanism, so a vectorial force acting on said mechanism can be generated.

Such method, wherein said equivalent vectorial force, is used for moving the body that the said mechanism is attached to, for example moving a turbine.

Such a method, wherein said mechanism supply a generally flow of particles, for different purposes, such as rotating a turbine.

Such a method, wherein said mechanism supply a pressure difference, between the two sides of the body that said mechanism is attached to, especially if the body is a membrane, and that pressure difference can be used for different purposes, for example: for moving a bodies including the said body itself, and moving a turbine.

Such a method, wherein said mechanism includes unidirectional permeable partition that selectively blocks more particles moving in one general direction than particles moving in the opposite general direction, by using for example a unidirectional gates with molecular size, and most of them are facing to the same side of the membrane, so they selectively blocks more moving particles that come from one direction than moving particles that come from opposite direction.

Such a method, wherein said mechanism includes tiny unidirectional elements, that their smallest dimension (from the three dimensions x,y,z) can be from 1 angstrom, till 0.2 mm, and at least most of this unidirectional elements are facing the same direction and selectively blocks more particles moving in one general direction than particles moving in the opposite general direction, for example by using a tiny unidirectional gates with molecular size, that most of them are facing to the same side of the membrane, so they selectively blocks more moving particles that come from one direction than moving particles that come from opposite direction, and particularly wherein said mechanism includes a tiny unidirectional gates, which are said tiny elements, and the smallest dimension of this gates (from the three dimensions x,y,z) can be from 1 angstrom, till 0.2 mm, and this unidirectional gates are on the same side of the membrane or inside the membrane and at least most of them are facing to the same side of the said membrane and selectively blocks more moving particles that move in one general direction than particles that move in the opposite direction, or wherein said mechanism includes a tiny unidirectional stoppers, which are said tiny elements, and their smallest dimension (from the three dimensions x,y,z) can be from 1 angstrom, till 0.2 mm, and that selectively blocks more particles moving in one general direction than particles moving in the opposite general direction, and this tiny unidirectional stoppers are installed on or in a body (also a surface) and at least most of them are facing to the same direction, so they cause a general flow of particles because of their operation.

Such a method, for using environmental heat, wherein said particles are ions and the mechanism use a magnetic field that can be created by a magnet (also meaning an electromagnet), which separate ions by the direction of their movements, and by this we cause ions that move in the same general direction hit muzzles from one side of this muzzles, so we selectively block more ions from one side of the said muzzles, than their other side.

A method for manufacturing a mechanism which converting kinetic energy of randomly moving particles into a usable form of energy, comprising the steps of:
   (a) obtaining a surface;
   (b) obtaining a substance that its molecules can be used as tiny unidirectional stoppers, that can be maneuvered under an appropriate vectorial force, for example: a magnetic force or electric force.
   (c) attaching said stoppers molecules to the said surface, by using of chemical processes, during operate the said appropriate vectorial force on this stoppers in one direction.

Such method, as said above, that uses at least one of the following chemical processes: a) Virts reaction; b) using a Griniar operator; c) using NaOH/KOH A method a manufacturing a mechanism for converting kinetic energy of randomly moving particles into a usable form of energy, comprising the steps of:
   (a) obtaining a permeable surface (like a permeable membrane);
   (b) obtaining a substance that its molecules can be used as tiny unidirectional gates, and their size is enough bigger related the membranes holes, so this molecules can't passing through the said permeable surface.
   (c) attaching the said gates molecules to only one side of the said surface, by using of chemical processes.

Such method, as said above, that uses one of the following chemical processes: a) Virts reaction; b) using a Griniar operator; c) using NaOH/KOH While the invention has been described with respect to a limited number of embodiments, it will be appreciated that many variations, modifications and other applications of the invention may be made.

What is claimed is:

1. A device for converting environmental heat into a usable form of energy, said device comprising at least one mechanism contactable with a fluid comprising randomly moving particles and said at least one mechanism selectively blocking more of said particles that are moving in a first general direction relatively to said at least one mechanism, than the particles that are moving in a second direction opposite to said first general direction, such that there is created thereby at least one imbalance, and wherein said mechanism comprises at least one of the following:
   a) a plurality of unidirectional stoppers mostly facing in a one common direction, wherein said unidirectional stoppers block more from said particles arriving from said direction as compared with particles from said particle arriving in opposite direction to said above direction;
   b) a plurality of unidirectional elements mostly facing in a one common direction, wherein said unidirectional elements block more from said particles arriving from said direction as compared with particles from said particles arriving in opposite direction to said above first one direction.

2. The device of claim 1, being using only of the following environmental heat sources from said environmental heat, as the only main external sources of energy for its operation:
   a) surrounding atmosphere;
   b) water;
   c) sunlight.

3. The device of claim 1, wherein said particles are selected from a list consist of atoms, molecules and clusters thereof.

4. The device of claim 1, wherein said fluid is selected from a list consist of gases and liquids.

5. The device of claim 1, wherein said imbalance is selected from a list consist of:
   a) vectorial forces acting on said mechanism;
   b) general flow of said particles, in an arbitrary but distinct direction in said fluid;
   c) pressure differences across said mechanism.

6. The device of claim 1, wherein said device further comprises a first disk shaped body covered with muzzles and a second disk shaped body covered with said plurality of unidirectional stoppers, one of said bodies being rotatable about an axis thereof.

7. The device of claim 1, wherein said device further comprises a first disk shaped body covered with muzzles, and a second disk shaped body including said at least one mechanism.

8. The device of claim 1, wherein said particles come from environment surrounding said device.

9. The device of claim 1, comprising said particles.

10. The device of claim 9, wherein said particles are chemically inert.

11. The device of claim 1, being connected to a turbine coupled to a generator for supplying electricity.

12. A mechanism for the device for converting environmental heat of claim 1, said mechanism comprising said plurality of unidirectional elements mostly facing in a one common direction, linear or rotational, wherein said unidirectional elements block more of the particles arriving from said direction as compared with some of the particles arriving in opposite direction to said above direction.

13. A system for converting environmental heat into a usable form of energy, said system comprising:
   (1) a container;
   (2) a device within said container, for converting environmental heat, said device including at least one mechanism contactable with a fluid comprising randomly moving particles, and said at least one mechanism selectively blocking more of said particles that are moving in a first general direction, relatively to said at least one mechanism, than the particles that are moving in a direction opposite to said first general direction, such that there is created thereby at least one imbalance, and wherein said at least one mechanism comprises at least one of the following:
   a) a plurality of unidirectional gates attached to a permeable membrane which having a first side and a second side, wherewith most of said unidirectional gates are open to only one common side of said membrane, preventing more of the particles from crossing said membrane from said first side to said second side, than the particles that are come crossing said partition from its second side to its first side;
   b) a plurality of unidirectional stoppers mostly facing in a one common direction, wherein said unidirectional stoppers block more of the particles arriving said direction as compared with the particles arriving in opposite direction to said above direction;
   c) a plurality of unidirectional elements mostly facing in a one common direction, wherein said unidirectional elements block more of the particles arriving from said direction as compared with the particles arriving in opposite direction to said above direction.

14. The system of claim 13, being using only of the following environmental heat sources from said environmental heat, as the only main external sources of energy for its operation:
   a) surrounding atmosphere;
   b) water;
   c) sunlight.

15. The system of claim 13, wherein said particles are selected from a list consist of atoms, molecules and clusters thereof.

16. The system of claim 13, wherein said fluid is selected from a list consist of gases and liquids.

17. The system of claim 13, wherein said imbalance is selected from a list consist of:
   a) vectorial forces acting on said at least one mechanism;
   b) general flow of said particles, in an arbitrary but distinct direction in said fluid;
   c) pressure differences across said at least one mechanism.

18. The system of claim 13, wherein said device further comprises a first disk shaped body covered with muzzles and a second disk shaped body covered with said plurality of unidirectional stoppers, one of said bodies being rotatable about an axis thereof.

19. The system of claim 13, wherein said device further comprises a first disk shaped body covered with muzzles, and a second disk shaped body including said at least one mechanism.

20. The system of claim 13, wherein said particles come from environment surrounding said system.

21. The system of claim 13, comprising said particles.

22. The system of claim 21, wherein said particles are chemically inert.

23. The system of claim 22, wherein said particles are atoms of noble gases.

24. The system of claim 13, wherein said container having walls, and this system being enclosed within said container, for preventing exchange of the particles between said system and said environment, thereby the system absorbing the environmental heat through at least part of the walls of said container.

25. The system of claim 13, further comprising a heat absorber.

26. The system of claim 13, comprising a turbine coupled to a generator for supplying electricity.

27. The system of claim 13, wherein its quality of converting environmental heat into a usable form of energy, is used for providing at least one of the following:
   a) a temperature differences; b) a cold temperature.

28. A device for converting environmental heat into a usable form of energy, said device comprising at least one mechanism contactable with a fluid comprising randomly moving electrically charged particles, and said at least one mechanism is comprising muzzles and comprising at least one of the following:
   a) a magnet;
   b) an electromagnet,
for providing a magnetic field designed for maneuvering the moving charged particles, relatively said muzzles, for selectively blocking more of said particles that are moving in a first general direction, linear or rotational, relatively to the muzzles, than the particles that are moving in a second direction opposite to said first general direction, such that there is created thereby at least one imbalance.

29. The device of claim 28, being using only of the following environmental heat sources from said environmental heat, as the only main external sources of energy for its operation:
   a) surrounding atmosphere;
   b) water;
   c) sunlight.

30. The device of claim 28, wherein said particles are selected from the list of atoms, molecules and clusters thereof.

31. The device of claim 28, wherein said imbalance is selected from a list consist of:
   a) vectorial forces acting on said at least one mechanism;
   b) general flow of said particles, in an arbitrary but distinct direction in said fluid.

32. The device of claim 28, wherein said muzzles being attached to at least one cylindrically shaped body, said cylindrically shaped body being rotatable about an axis thereof, said cylindrically shaped body being encased within a casing.

33. The device of claim 28, wherein said device comprises at least one cylindrically shaped body being rotatable about an axis thereof, within a casting, and said muzzles being attached at least to said casing.

34. The device of claim 28, wherein said device further comprises a first disk shaped body covered with muzzles, and a second disk, shaped body including said at least one mechanism.

35. The device of claim 28, comprising said particles.

36. The device of claim 35, wherein said particles are chemically insert.

37. The device of claim 28, comprising a generator for supplying electricity.

38. A system for converting environmental heat into a usable form of energy, said system comprising:
  (1) a container;
  (2) a device, within said container, said device comprising at least one mechanism contactable with a fluid comprising randomly moving electrically changed particles, and said at least one mechanism is comprising muzzles and comprising at least one of the folowing:
   a) a magnet;
   b) an electromagnet, for providing a magnetic field designed for maneuvering the moving charged particles, relatively said muzzles, for selectively blocking more of said particles that are moving relatively to the muzzles in a first general direction, than the particles that are moving in a direction opposite to the first general direction, such that there is created thereby at least one imbalance.

39. The system of claim 38, being using only of the following environmental heat sources from said environmental heat, as the only main external sources of energy for its operation:
  a) surrounding atmosphere;
  b) water;
  c) sunlight.

40. The system of claim 38, wherein said particles are selected from a list consist of atoms, molecules and clusters thereof.

41. The system of claim 38, wherein said imbalance is selected from a list consist of:
  a) vectorial forces acting on said mechanism;
  b) general flow of said particles, in an arbitrary but distinct direction in said fluid.

42. The system of claim 38, wherein said muzzles are being attached to at least one cylindrically shaped body, and said cylindrically shaped body being rotatable about an axis thereof, said cylindrically shaped body being encased within a casing.

43. The system of claim 38, wherein said device further comprises at least one cylindrically shaped body being rotatable about an axis thereof, within a casing, and said muzzles are being attached at least to said casing.

44. The system of claim 13, wherein said device further comprises a first disk shaped body covered with muzzles, and a second disk shaped body including said at least one mechanism.

45. The system of claim 38 comprising said particles.

46. The system of claim 45, wherein said particles are chemically inert.

47. The system of claim 38, wherein said container having walls, and this system enclosed within said container, for preventing exchange of the particles between said system and said environment, thereby the system absorbing the environmental heat through at least part of the walls of said container.

48. The system of claim 38, further comprising a heat absorber.

49. The system of claim 38, comprising a generator for supplying electricity.

50. The system of claim 38, wherein its quality of converting environmental heat into a usable form of energy, is used for providing at least one of the following:
  a) a temperature differences; b) a cold temperature.

* * * * *